(12) United States Patent
Pope et al.

(10) Patent No.: US 10,064,251 B2
(45) Date of Patent: Aug. 28, 2018

(54) UPDATABLE LIGHTING FIXTURES AND RELATED COMPONENTS

(71) Applicant: Cree, Inc., Durham, NC (US)

(72) Inventors: Daniel J. Pope, Morrisville, NC (US); John J. Trainor, Durham, NC (US); Arnold Motley, Cary, NC (US)

(73) Assignee: Cree, Inc., Durham, NC (US)

( * ) Notice: Subject to any disclaimer, the term of this patent is extended or adjusted under 35 U.S.C. 154(b) by 475 days.

(21) Appl. No.: 13/833,608

(22) Filed: Mar. 15, 2013

(65) Prior Publication Data
US 2014/0265919 A1  Sep. 18, 2014

(51) Int. Cl.
*H05B 33/08* (2006.01)
*G06F 9/4401* (2018.01)
*H05B 37/02* (2006.01)
*G06F 8/654* (2018.01)

(52) U.S. Cl.
CPC ......... *H05B 33/0842* (2013.01); *G06F 8/654* (2018.02); *G06F 9/4411* (2013.01); *H05B 33/0806* (2013.01); *H05B 37/0254* (2013.01)

(58) Field of Classification Search
CPC .............................. G06F 9/24; H05B 33/0842
USPC ......................................... 315/291, 294, 312
See application file for complete search history.

(56) References Cited

U.S. PATENT DOCUMENTS

2008/0092075 A1*  4/2008  Jacob et al. ................... 715/771
2010/0257345 A1* 10/2010  Tazzari et al. ................... 713/1
2011/0178650 A1*  7/2011  Picco ............................. 700/295
2012/0173857 A1*  7/2012  Kobraei et al. .................... 713/2
2014/0184096 A1*  7/2014  Ng ..................... H05B 33/0827 315/296

FOREIGN PATENT DOCUMENTS

| WO | 03013103 A2 | 2/2003 |
| WO | 03025742 A2 | 3/2003 |
| WO | 2009044416 A1 | 4/2009 |

OTHER PUBLICATIONS

International Search Report and Written Opinion for PCT/US2014/023894, dated Dec. 8, 2014, 13 pages.

(Continued)

*Primary Examiner* — Douglas W Owens
*Assistant Examiner* — Pedro C Fernandez
(74) *Attorney, Agent, or Firm* — Withrow & Terranova, P.L.L.C.

(57) ABSTRACT

Systems and methods related to lighting fixtures for solid-state light sources are disclosed. In one embodiment, a lighting fixture includes a driver module and a communications module. The driver module is configured to execute driver program code, which causes the driver module to generate a drive output that drives one or more solid-state light sources. To provide updates, the communications module is configured to receive updated driver program code from a remote device and send the updated driver program code to the driver module. The driver module is configured to erase the driver program code and write the updated driver program code received from the communications module to memory. In this manner, updates can be provided to the lighting fixture without having to remove the lighting fixture from a support structure.

18 Claims, 19 Drawing Sheets

(56) References Cited

OTHER PUBLICATIONS

International Preliminary Report on Patentability for International Patent Application No. PCT/US2014/023894, dated Sep. 24, 2015, 6 pages.
Examination Report for European Patent Application No. 14726017.8, dated Dec. 20, 2017, 6 pages.

* cited by examiner

UPDATABLE LIGHTING FIXTURES AND RELATED COMPONENTS

FIELD OF THE DISCLOSURE

This disclosure relates to lighting fixtures for solid-state light sources.

BACKGROUND

In recent years, a movement to replace incandescent light bulbs with lighting fixtures that employ more efficient lighting technologies, as well as to replace relatively efficient fluorescent lighting fixtures with lighting technologies that produce a more pleasing, natural light, has gained traction. One such technology that shows tremendous promise employs light emitting diodes (LEDs). Compared with incandescent bulbs, LED-based light fixtures are much more efficient at converting electrical energy into light, are longer lasting, and are also capable of producing light that appears very natural. Compared with fluorescent lighting, LED-based fixtures are also very efficient, but are capable of producing light that appears much more natural and is more capable of accurately rendering colors. As a result, lighting fixtures that employ LED technologies are expected to replace incandescent and fluorescent bulbs in residential, commercial, and industrial applications.

Unlike incandescent bulbs, which operate by subjecting a filament to a desired current, LED-based lighting fixtures require electronics to drive one or more LEDs. The electronics generally include a power supply and a special control circuitry to provide uniquely configured signals that are required to drive the one or more LEDs in a desired fashion. The presence of the control circuitry adds a potentially significant level of intelligence to the lighting fixtures. This control circuitry may include executable code that can be leveraged to employ various types of lighting control functionality.

Updating the executable code is desirable in order to provide additional lighting control functionality or to fix bugs. Unfortunately, this is often cumbersome, since it can require removing the lighting fixture from a support structure. Large facilities may have a plethora of lighting fixtures, making updates laborious and expensive. As such, more efficient components and techniques are needed to provide updates for the lighting fixtures.

SUMMARY

The present disclosure discloses systems and methods related to lighting fixtures for solid-state light sources. In one embodiment, a lighting fixture includes a driver module that drives one or more solid-state lighting sources, such as an array of LEDs, and a communications module. The driver module has memory that is configured to store driver program code, which controls operation of the driver module. The driver module is configured to execute the driver program code, which among other things, causes the driver module to generate a drive output that is used to drive the solid state lighting source in a prescribed manner. With regard to the communications module, the communications module is configured to receive updated driver program code from a remote device. After receiving the updated driver program code, the communications module is configured to send an update command to the driver module. The driver module is configured to erase the driver program code in the memory of the driver module in response to the update command. The communications module may then send the updated driver program code to the driver module. The driver module is configured to write the updated driver program code received from the communications module in the memory of the driver module. In this manner, updates can be provided to the lighting fixture without having to remove the lighting fixture from a support structure.

In one embodiment of the communications module, the communications module may also include memory, which may be used to help maintain the integrity of the updated driver program code. The communications module is configured to receive data packets with the updated driver program code from the remote device. Furthermore, the communications module may also be configured to assemble the updated driver program code from the data packets in the memory. Once the updated driver program code is assembled in the memory of the communications module, the communications module may send the updated driver program code to the driver module as described above.

In one embodiment of the driver module, the memory of the driver module is further configured to store bootloader code. The bootloader code may include reset code and update command handler code. The driver module is configured to execute the bootloader code, wherein the update command handler code causes the driver program to erase the driver program code in the memory of the driver module and write the updated driver program code to the memory of the driver module, as described above. Once the update command handler code has been executed, the driver module may be configured to execute the reset code, which causes the driver module to be reset. The driver module may then execute the updated driver program code.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
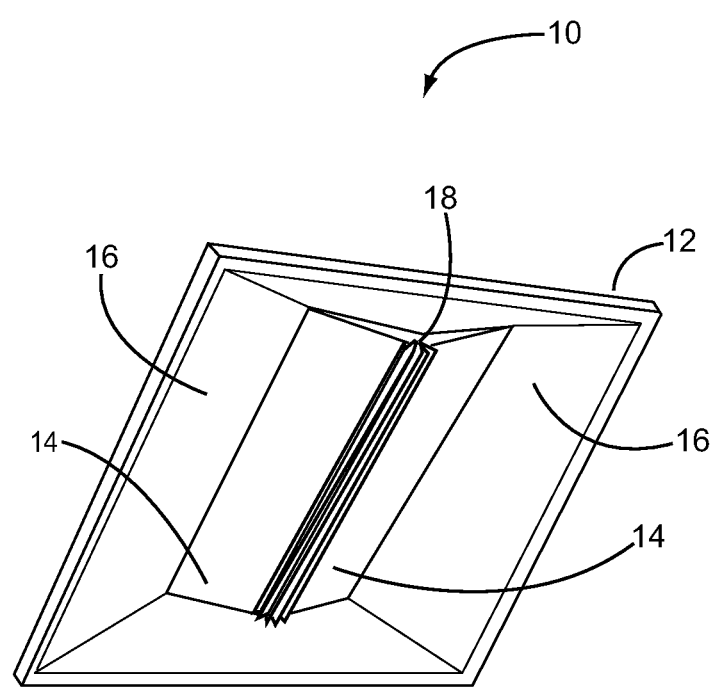
FIG. 1 is a perspective view of a troffer-based lighting fixture according to one embodiment of the disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Systems and methods related to lighting fixtures for solid-state light sources, such as light emitting diodes (LEDs), are disclosed. A lighting fixture may include a driver module, which may be configured to drive one or more solid-state light sources. Exemplary driver modules may be operable to provide various types of lighting control functionality, as well as other types of functionality related to operating one or more solid-state light source. To provide this functionality, the driver module has memory that is configured to store driver program code. For example, the memory of the driver module may be partitioned to define a program memory segment in the memory that stores the driver program code.

The driver module is configured to execute the driver program code, which causes the driver module to generate a drive output. This drive output is operable to regulate current, voltage, or power signals used to drive the one or more solid-state lighting devices. The driver program code may thus instruct the driver module to control one or more drive signals in the drive output so as to turn on, turn off, dim to a desired level, output light at a desired color and color temperature, and the like. The driver program code may also control the general operation of the driver module and the manner in which is interacts with other lighting fixtures, the communication module, and the like.

To communicate with remote devices, the lighting fixture may also include a communications module. Remote devices may be, but are not limited to, desktop computers, laptops, tablets, personal digital assistants, mobile communications devices, computer network servers, telecommunications servers, communication satellites, base stations, communication boxes, databases, routers, relays, gateways, other lighting fixtures, and/or the like. To allow updates to the lighting fixture without having to remove the lighting fixture from a support structure, the communications module is configured to receive updated driver program code from the remote device. In response to receiving the updated driver program code, the communications module is configured to send an update command to the driver module. The driver module of the lighting fixture is configured to erase the driver program code in the memory in response to the update command. The communications module may then send the updated driver program code to the driver module.

FIG. 1 illustrates one embodiment of a lighting fixture 10. The lighting fixture 10 includes a square or rectangular outer frame 12. In the central portion of the lighting fixture 10 are two rectangular lenses 14, which are generally transparent, translucent, or opaque. Reflectors 16 extend from the rectangular outer frame 12 to the outer edges of the rectangular lenses 14. The rectangular lenses 14 effectively extend between the innermost portions of the reflectors 16 to an elongated heatsink 18, which functions to join the two inside edges of the rectangular lenses 14.

Figure 2:
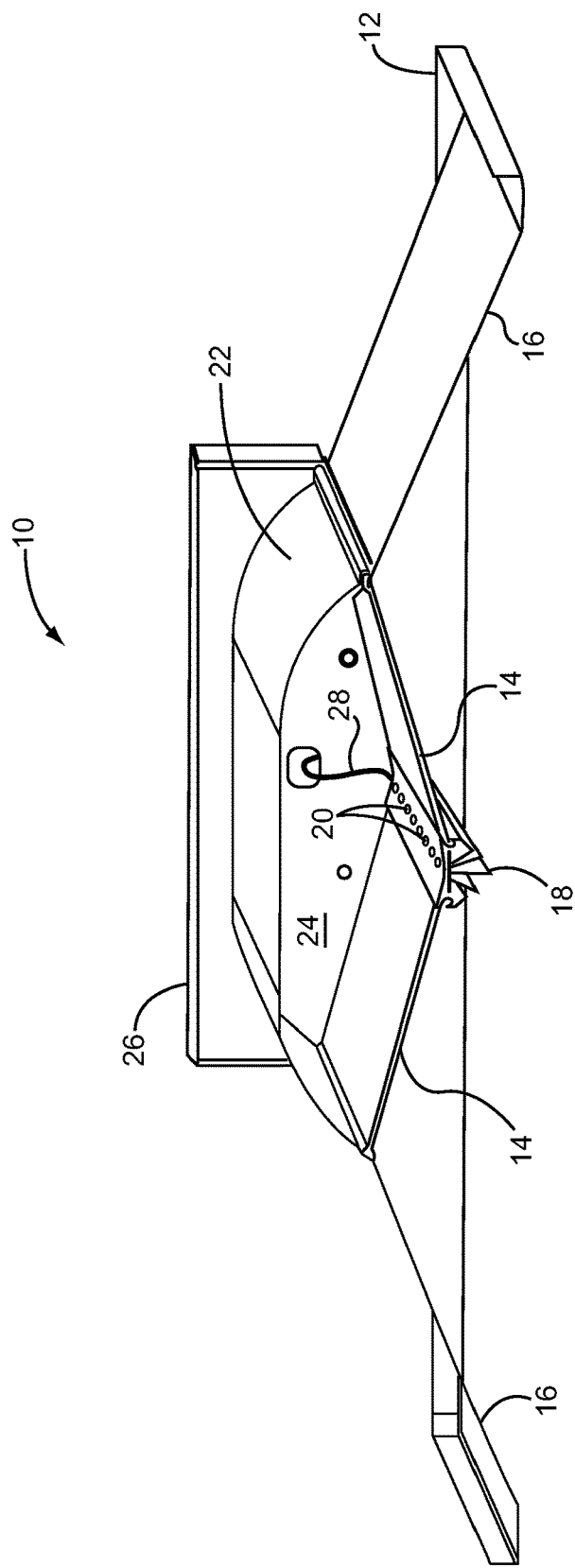
FIG. 2 is a cross section of the lighting fixture of FIG. 1.
Figure 3:
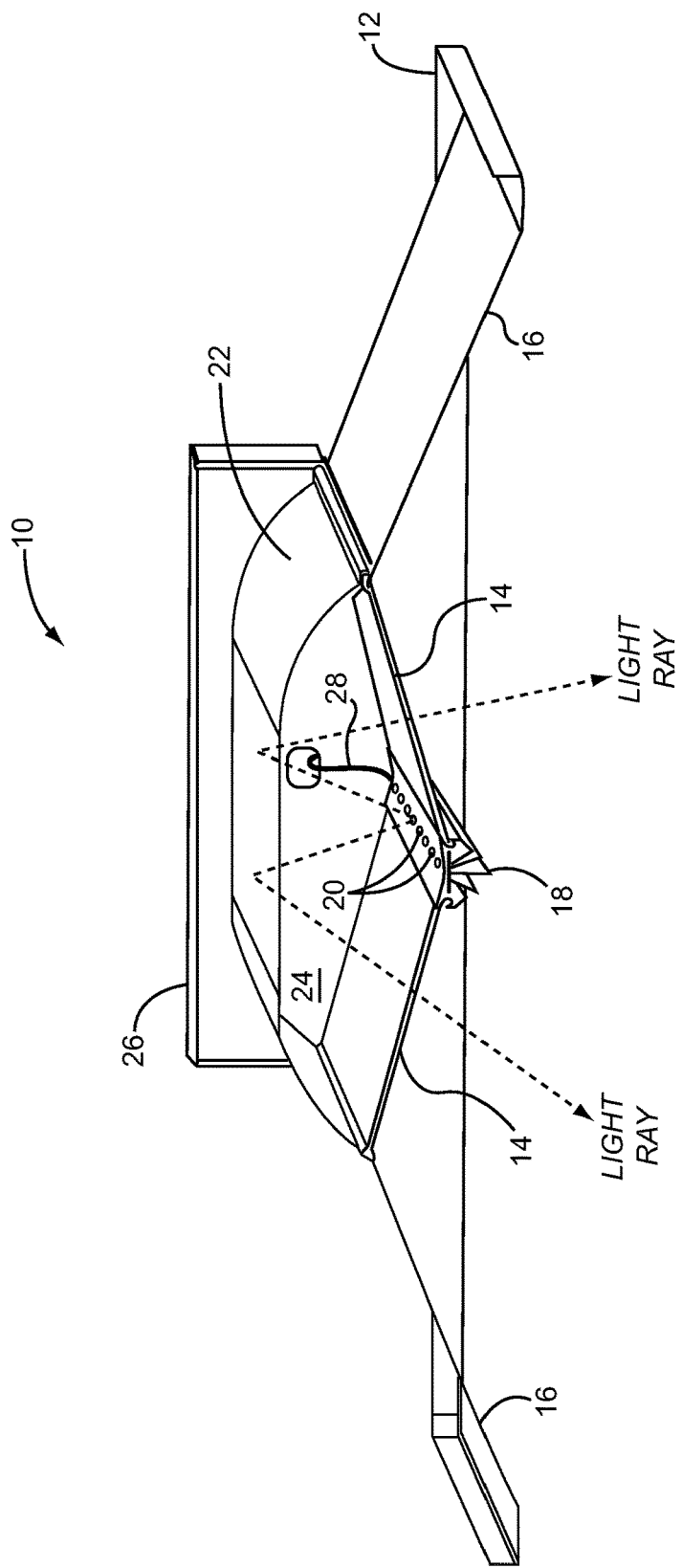
FIG. 3 is a cross section of the lighting fixture of FIG. 1 illustrating how light emanates from the light emitting diodes (LEDs) of the lighting fixture and is reflected out through lenses of the lighting fixture.

Turning now to FIGS. 2 and 3 in particular, the back side of the elongated heatsink 18 provides a mounting structure for an LED array 20, which includes one or more rows of individual LEDs mounted on an appropriate substrate. The LEDs are oriented to primarily emit light upwards toward a concave cover 22. The volume bounded by the concave cover 22, the rectangular lenses 14, and the back of the elongated heatsink 18 provides a mixing chamber 24. As such, light will emanate upwards from the LEDs of the LED array 20 toward the concave cover 22 and will be reflected downward through the respective rectangular lenses 14, as illustrated in FIG. 3. Notably, not all light rays emitted from the LEDs will reflect directly off of the bottom of the concave cover 22 and back through a particular rectangular lens 14 with a single reflection. Many of the light rays will bounce around within the mixing chamber 24 and effectively mix with other light rays, such that a desirably uniform light is emitted through the respective rectangular lenses 14.

Those skilled in the art will recognize that the type of rectangular lenses 14, the type of LEDs, the shape of the concave cover 22, and any coating on the bottom side of the concave cover 22, among many other variables, will affect the quantity and quality of light emitted by the lighting fixture 10. As will be discussed in greater detail below, the LED array 20 may include LEDs of different colors, wherein the light emitted from the various LEDs mixes together to form a white light having a desired color temperature and quality based on the design parameters for the particular embodiment.

As is apparent from FIGS. 2 and 3, the elongated fins of the elongated heatsink 18 may be visible from the bottom of the lighting fixture 10. Placing the LEDs of the LED array 20 in thermal contact along the upper side of the elongated heatsink 18 allows any heat generated by the LEDs to be effectively transferred to the elongated fins on the bottom side of the elongated heatsink 18 for dissipation within the room in which the lighting fixture 10 is mounted. Again, the particular configuration of the lighting fixture 10 illustrated in FIGS. 1-3 is merely one of the virtually limitless configurations for lighting fixtures 10 in which the concepts of the present disclosure are applicable. An electronics housing 26 is shown mounted at one end of the lighting fixture 10, and is used to house all or a portion of the electronics used to power and control the LED array 20. These electronics are coupled to the LED array 20 through cabling 28, which may be any type of suitable cabling.

Figure 4:
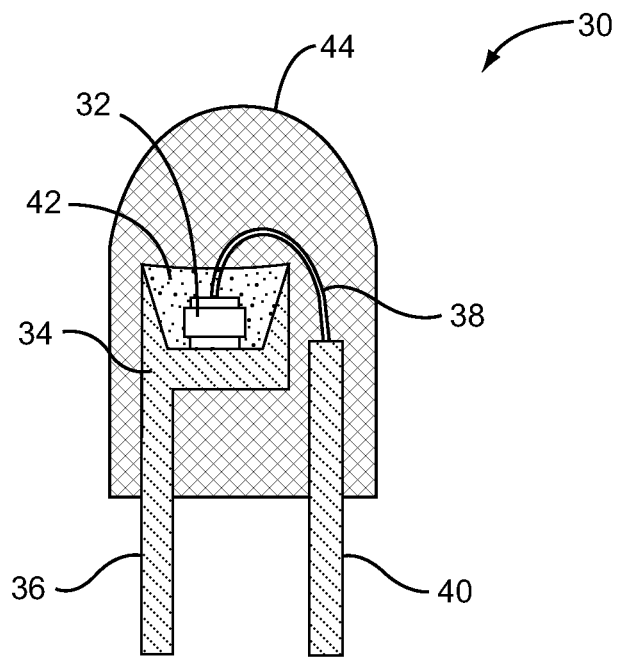
FIG. 4 illustrates one embodiment of an LED, which may be included in the LED arrays shown in FIGS. 2 and 3.

FIG. 4 illustrates one embodiment an LED 30, which may be included in the LED array 20 shown in FIGS. 2 and 3. In this embodiment, a single LED chip 32 is mounted on a reflective cup 34 using solder or a conductive epoxy, such that ohmic contacts for a cathode (or an anode) of the LED chip 32 are electrically coupled to the bottom of the reflective cup 34. The reflective cup 34 is either coupled to or integrally formed with a first lead 36 of the LED 30. One or more bond wires 38 connect ohmic contacts for the anode (or cathode) of the LED chip 32 to a second lead 40.

The reflective cup 34 may be filled with an encapsulant material 42 that encapsulates the LED chip 32. The encapsulant material 42 may be transparent or may contain a wavelength conversion material, such as a phosphor, which is described in greater detail below. The entire assembly is encapsulated in a transparent protective resin 44, which may be molded in the shape of a lens to control the light emitted from the LED chip 32.

Figure 5:
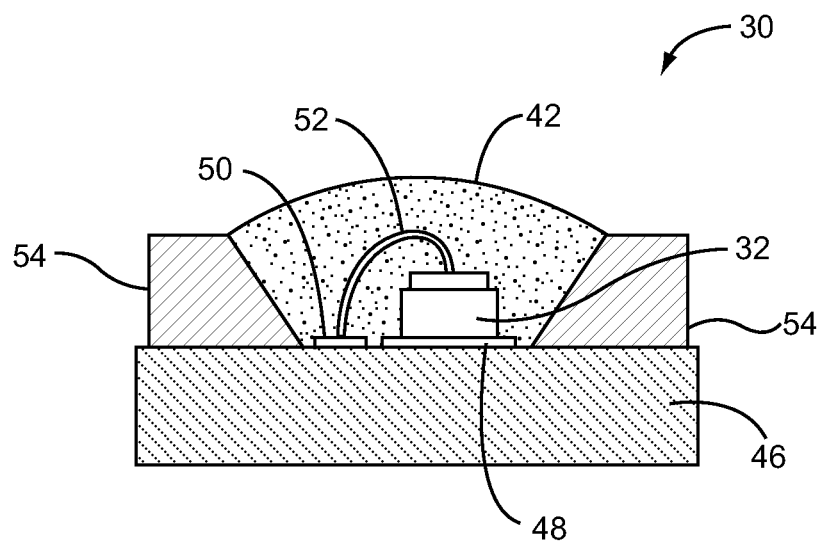
FIG. 5 is a cross section of an alternative package for an LED, wherein an LED chip is mounted on a substrate.

An alternative package for an LED 30 is illustrated in FIG. 5, wherein the LED chip 32 is mounted on a substrate 46. In particular, the ohmic contacts for the anode (or cathode) of the LED chip 32 are directly mounted to first contact pads 48 on the surface of the substrate 46. The ohmic contacts for the cathode (or anode) of the LED chip 32 are connected to second contact pads 50, which are also on the surface of the substrate 46, using bond wires 52. The LED chip 32 resides in a cavity of a reflector structure 54, which is formed from a reflective material and functions to reflect light emitted from the LED chip 32 through the opening formed by the reflector structure 54. The cavity formed by the reflector structure 54 may be filled with the encapsulant material 42 that encapsulates the LED chip 32. The encapsulant material 42 may be transparent or may contain a wavelength conversion material, such as a phosphor.

In either of the embodiments of FIGS. 4 and 5, if the encapsulant material 42 is transparent, the light emitted by the LED chip 32 passes through the encapsulant material 42 and the transparent protective resin 44 without any substantial shift in color. As such, the light emitted from the LED chip 32 is effectively the light emitted from the LED 30. If the encapsulant material 42 contains a wavelength conversion material, substantially all or a portion of the light emitted by the LED chip 32 in a first wavelength range may be absorbed by the wavelength conversion material, which will responsively emit light in a second wavelength range. The concentration and type of wavelength conversion material will dictate how much of the light emitted by the LED chip 32 is absorbed by the wavelength conversion material, as well as the extent of the wavelength conversion. In embodiments where some of the light emitted by the LED chip 32 passes through the wavelength conversion material without being absorbed, the light passing through the wavelength conversion material will mix with the light emitted by the wavelength conversion material. Thus, when a wavelength conversion material is used, the light emitted from the LED 30 is shifted in color from the actual light emitted from the LED chip 32.

For example, the LED array 20 may include a group of blue shifted yellow (BSY) or blue shifted green (BSG) LEDs 30, as well as a group of red LEDs 30. BSY LEDs 30 include an LED chip 32 that emits bluish light, and the wavelength conversion material is a yellow phosphor that absorbs the blue light and emits yellowish light. Even if some of the bluish light passes through the phosphor, the resultant mix of light emitted from the overall BSY LED 30 is yellowish light. The yellowish light emitted from a BSY LED 30 has a color point that falls above the Black Body Locus (BBL) on the 1931 International Commission on Illumination (CIE) chromaticity diagram, wherein the BBL corresponds to the various color temperatures of white light.

Similarly, BSG LEDs 30 include an LED chip 32 that emits bluish light; however, the wavelength conversion material is a greenish phosphor that absorbs the blue light and emits greenish light. Even if some of the bluish light passes through the phosphor, the resultant mix of light emitted from the overall BSG LED 30 is greenish light. The greenish light emitted from a BSG LED 30 has a color point that falls above the BBL on the 1931 CIE chromaticity diagram, wherein the BBL corresponds to the various color temperatures of white light.

The red LEDs 30 generally emit reddish light at a color point on the opposite side of the BBL as the yellowish or greenish light of the BSY or BSG LEDs 30. As such, the reddish light from the red LEDs 30 mixes with the yellowish or greenish light emitted from the BSY or BSG LEDs 30 to generate white light that has a desired color temperature and falls within a desired proximity of the BBL. In effect, the reddish light from the red LEDs 30 pulls the yellowish or greenish light from the BSY or BSG LEDs 30 to a desired color point on or near the BBL. Notably, the red LEDs 30 may have LED chips 32 that natively emit reddish light, wherein no wavelength conversion material is employed. Alternatively, the LED chips 32 may be associated with a wavelength conversion material, wherein the resultant light emitted from the wavelength conversion material and any light that is emitted from the LED chips 32 without being absorbed by the wavelength conversion material mix to form the desired reddish light.

The blue LED chip 32 used to form either the BSY LED 30 or the BSG LED 30 may be formed from a gallium nitride (GaN), indium gallium nitride (InGaN), silicon carbide (SiC), zinc selenide (ZnSe), or like material system. The red LED chip 32 may be formed from an aluminum indium gallium nitride (AlInGaN), gallium phosphide (GaP), aluminum gallium arsenide (AlGaAs), or like material system. Exemplary yellow phosphors include cerium-doped yttrium aluminum garnet (YAG:Ce), yellow BOSE (Ba, O, Sr, Si, Eu) phosphors, and the like. Exemplary green phosphors include green BOSE phosphors, lutetium aluminum garnet (LuAg), cerium-doped LuAg (LuAg:Ce), Maui M535 from Lightscape Materials, Inc. of 201 Washington Road, Princeton, N.J. 08540, and the like. The above LED architectures, phosphors, and material systems are merely exemplary and are not intended to provide an exhaustive listing of architectures, phosphors, and material systems that are applicable to the concepts disclosed herein.

Figure 6:
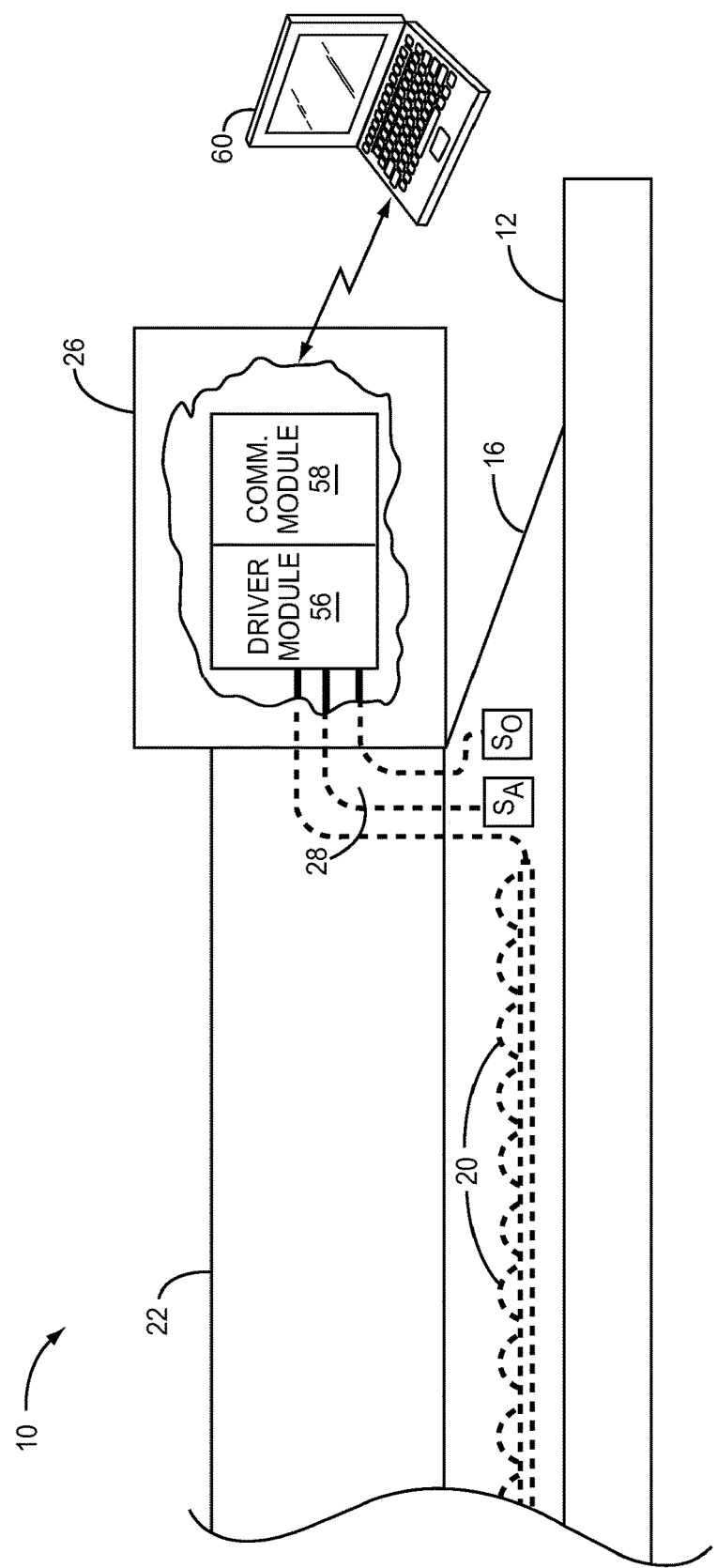
FIG. 6 illustrates a driver module and a communications module integrated within an electronics housing of the lighting fixture of FIG. 1.

With reference to FIG. 6, the electronics provided in the electronics housing 26 may be divided into a driver module 56 and a communications module 58. In this embodiment, the driver module 56 is coupled to the LED array 20 and directly drives the LEDs in the LED array 20 through the cabling 28. As explained in further detail below, the driver module 56 has memory (not shown) that is configured to store a driver program code. The driver module 56 is configured to execute the driver program code, wherein the driver program code causes the driver module 56 to generate a drive output. The drive output is operable to drive the LEDs of the LED array 20. Thus, the driver program code may cause the driver module 56 to generate the drive output so that power is regulated to provide one or more lighting control functions. The drive output may include one or more drive signals, either digital drive signals or analog drive signals. Each of the drive signals may be generated to control one, a proper subset, or all of the LEDs in the LED array 20. In addition, the driver program code may also cause the driver module 56 to provide various other types of functionality, as explained in further detail below. As such, the driver module 56 may directly drive the LEDs of the LED array 20 based on control information. Exemplary embodiments of the driver module 56 may be provided on a single, integrated module or divided into two or more sub-modules depending on the desires of the designer.

The communications module 58 may operate as an intelligent communication interface that facilitates communications between the driver module 56 and a remote device 60, which in this example is a desktop computer. As such, the communications module 58 may be configured to establish a communication link with the remote device 60 in a wired or wireless fashion. As such, the communications module 58 is configured to facilitate communications with the remote device 60 through at least one communication service. Some embodiments of the communications module 58 may be operable to establish various types of communication links in accordance with a variety of different communications services. Accordingly, the communications module 58 may include a variety of different communication components depending on the communication specifications for the different communication services, the communication components of the remote device 60, and/or the type or types of communication environments in which the communications module 58 is designed to operate. The communications module 58 shown in FIG. 6 is configured to establish radio frequency (RF) communication links. Accordingly, the communications module 58 may include an antenna(s), antenna tuner(s), receiver and transmitter chains, filtering circuits, mixing circuitry, wireless adapters, and/or the like. The communications module 58 may also be configured to establish communication links in a wired fashion, and thus may include one or more wired network adapters, such as an Ethernet card or a modem, and/or the like.

The communications module 58 is configured to receive updated driver program code from the remote device 60. In response to receiving updated driver program code, the communications module 58 is configured to send an update command to the driver module 56 in the lighting fixture 10. In response to the update command, the driver module 56 is configured to erase the driver program code in the memory of the driver module 56. The communications module 58 may then send the updated driver program code to the driver module 56. The driver module 56 is configured to write the updated driver program code in the memory of the driver module 56 when the updated driver program code is received from the communications module 58. In this manner, updates can be provided to the lighting fixture 10 without having to remove the lighting fixture 10 from a support structure.

The remote device 60 may be a device that originated the updated driver program code or may simply be a device that was relayed the updated driver program code from another remote device. In one embodiment, the communications module 58 is configured to establish a communication link in accordance with a "standard" protocol to receive the updated driver program code from the remote device 60. The term "standard protocol" is defined to mean any type of known or future developed, proprietary or industry-standardized protocol. For example, the communications module 58 may be configured to establish an RF communication link with the remote device 60 in accordance with an 802.15.4 protocol.

In this embodiment, the remote device 60 is a portable commissioning tool, which may be used for a variety of functions, including the commissioning of a lighting network. Accordingly, the lighting fixture 10 may be part of the lighting network commissioned by the remote device 60. The communications module 58 of the lighting fixture 10 may also establish communication links with other lighting fixtures, which may be different from or identical to the lighting fixture 10, to commission the lighting network. While the remote device 60 shown in FIG. 6 is not a lighting fixture, in other embodiments, the remote device 60 may be another lighting fixture, like the lighting fixture 10, which is operable to relay the updated driver program code to the lighting fixture 10. Furthermore, the lighting fixture 10 may serve as the remote device 60 to one or more other lighting fixtures and thereby relay the updated driver program code to those other lighting fixtures. Once the lighting network is commissioned, the communications module 58 may also function to coordinate the sharing of intelligence and other data among the lighting fixtures and other devices on the lighting network. For example, the lighting fixture 10 may transmit and receive any type of data, including sensor data, commands, and control information on the lighting network.

The driver module 56 and the communications module 58 may be operably associated with one another in any suitable manner. In this embodiment, the communications module 58 of the lighting fixture 10 is provided on a separate printed circuit board (PCB) than the driver module 56 within the electronics housing 26. The respective PCBs of the driver module 56 and the communications module 58 may be configured to allow a connector of the communications module 58 to plug into a connector of the driver module 56, wherein the communications module 58 is mechanically mounted, or affixed, to the driver module 56 once the connector of the communications module 58 is plugged into the mating connector of the driver module 56.

In other embodiments, a bus or a cable may be used to connect the respective connectors of the driver module 56 and the communications module 58; other attachment mechanisms may be used to physically couple the communications module 58 to the driver module 56; or the driver module 56 and the communications module 58 may be separately affixed to the inside of the electronics housing 26. In such embodiments, the interior of the electronics housing 26 is sized appropriately to accommodate both the driver module 56 and the communications module 58. In many instances, the electronics housing 26 provides a plenum rated enclosure for both the driver module 56 and the communications module 58. With the embodiment of FIG. 6, adding or replacing the communications module 58 requires gaining access to the interior of the electronics housing 26. If this is undesirable, the driver module 56 may be provided alone in the electronics housing 26.

Figure 7:
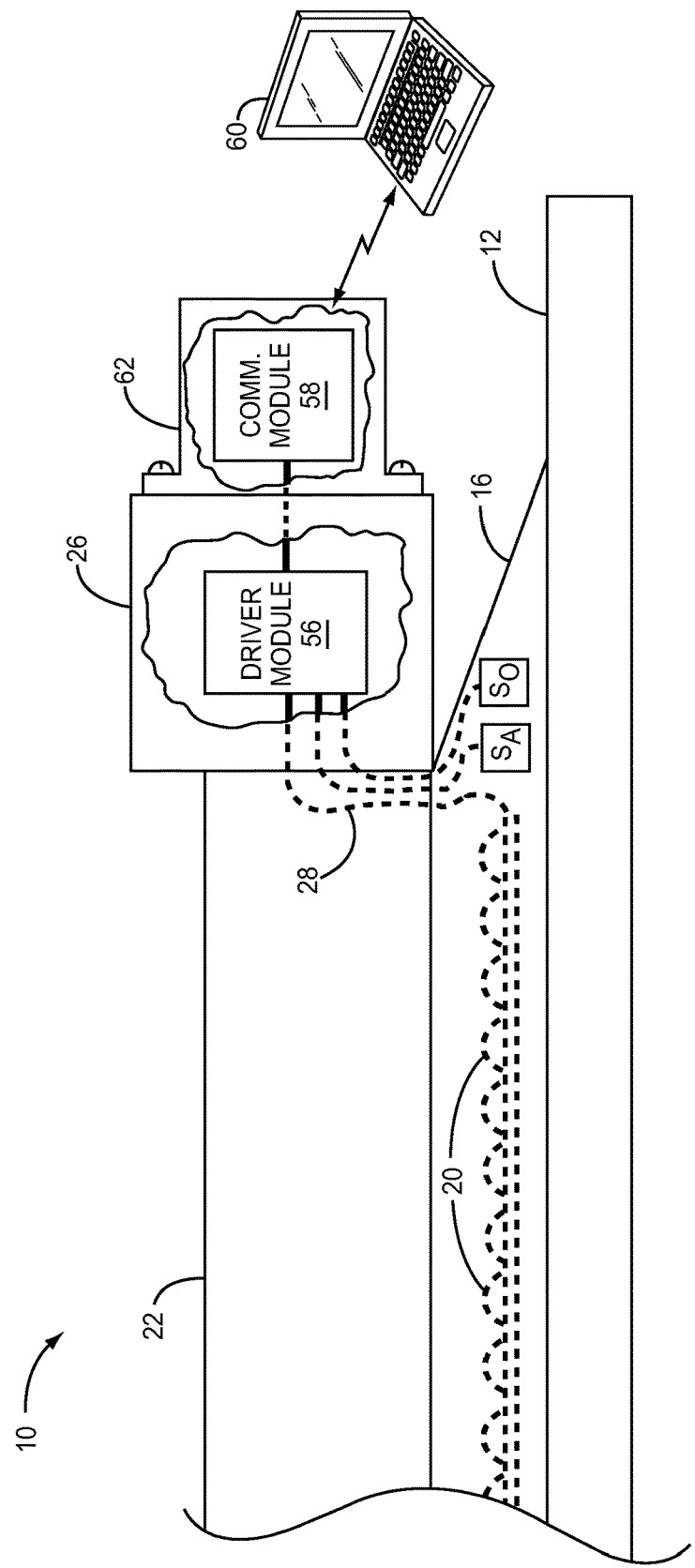
FIG. 7 illustrates another embodiment of the lighting fixture of FIG. 1, in which the communications module is mounted outside of the electronics housing.

FIG. 7 illustrates another embodiment of the lighting fixture 10 in which the communications module 58 is mounted outside of the electronics housing 26. As such, the communications module 58 is mounted in an exposed fashion or within a supplemental housing 62, which may be directly or indirectly coupled to the outside of the electronics housing 26, as shown in FIG. 7. The supplemental housing 62 may be bolted to the electronics housing 26. The supplemental housing 62 may alternatively be connected to the electronics housing 26 using snap-fit or hook-and-snap mechanisms. The supplemental housing 62, alone or when coupled to the exterior surface of the electronics housing 26, may provide a plenum rated enclosure.

In embodiments where the electronics housing 26 and the supplemental housing 62 will be mounted within a plenum rated enclosure, the supplemental housing 62 may not need to be plenum rated. Further, the communications module 58 may be directly mounted to the exterior of the electronics housing 26 without any need for a supplemental housing 62, depending on the nature of the electronics provided in the communications module 58, how and where the lighting fixture 10 will be mounted, and the like. The latter embodiment, wherein the communications module 58 is mounted outside of the electronics housing 26, may prove beneficial when the communications module 58 facilitates wireless communications with the other lighting fixtures 10, the remote device 60, or other network or auxiliary devices. In essence, the driver module 56 may be provided in the plenum rated electronics housing 26, which may not be conducive to wireless communications. The communications module 58 may be mounted outside of the electronics housing 26 by itself or within the supplemental housing 62 that is more conducive to wireless communications. A cable may be provided between the driver module 56 and the communications module 58 according to a defined communication interface.

The embodiments that employ mounting the communications module 58 outside of the electronics housing 26 may be somewhat less cost-effective, but provide significant flexibility in allowing the communications module 58 or other auxiliary devices to be added to the lighting fixture 10, serviced, or replaced. The supplemental housing 62 for the communications module 58 may be made of a plenum rated plastic or metal, and may be configured to readily mount to the electronics housing 26 through snaps, screws, bolts, or the like, as well as to receive the communications module 58. The communications module 58 may be mounted to the inside of the supplemental housing 62 through snap-fits, screws, twistlocks, and the like. The cabling and connectors used for connecting the communications module 58 to the driver module 56 may take any available form, such as with standard category 5 (cat 5) cable having RJ45 connectors, edge card connectors, blind mate connector pairs, terminal blocks and individual wires, and the like. With the communications module 58 externally mounted relative to the electronics housing 26 allows for easy field installation of different types of communications modules, like the communications module 58, for a given driver module 56.

Figure 8:
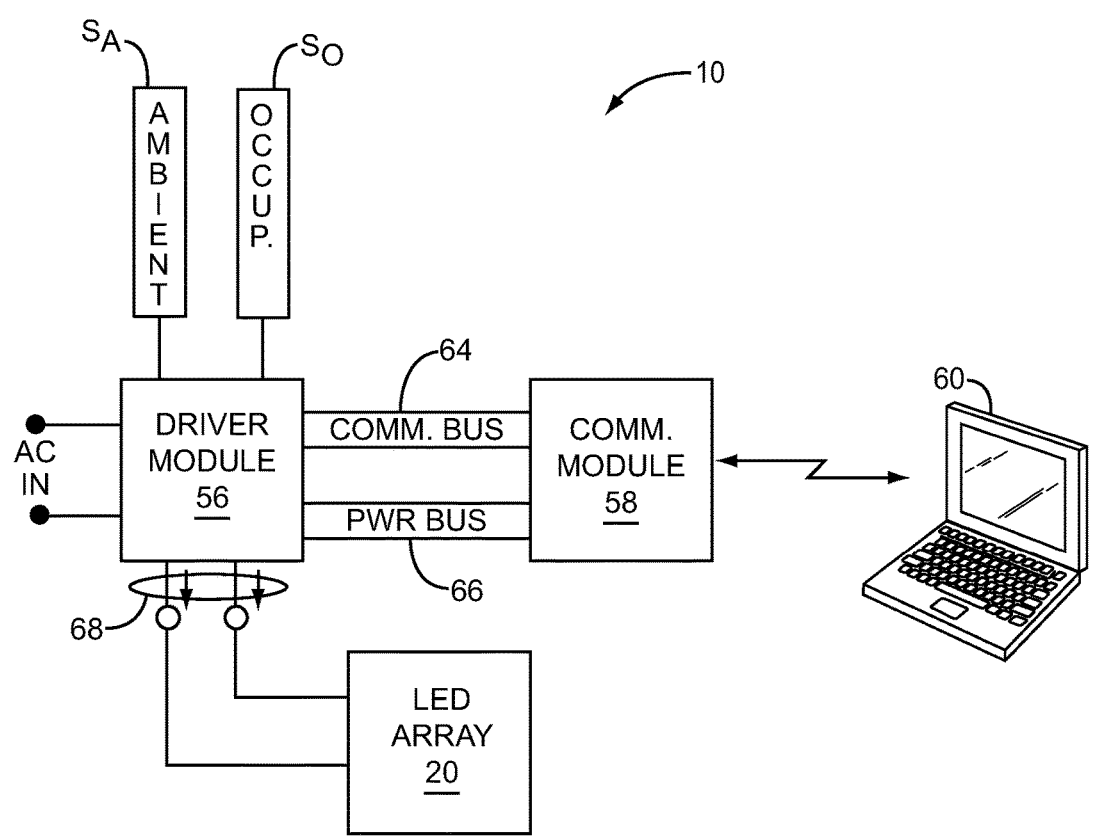
FIG. 8 is a block diagram of one embodiment of the lighting fixture of FIG. 1.

FIG. 8 illustrates a block diagram of one embodiment of the lighting fixture 10. For purposes of discussion, assume that the communications module 58 and the remote device 60 have already established a communication link through wired or wireless techniques. The communications module 58 is configured to receive updated driver program code from the remote device 60 over the communication link.

The driver module 56 and the communications module 58 shown in FIG. 8 are operably associated via a communication (COMM) bus 64 and a power (PWR) bus 66. The communication bus 64 allows the communications module 58 and the driver module 56 to send and receive commands and data to one another. An exemplary communication bus 64 is the well-known inter-integrated circuitry ($I^2C$) bus, which is a serial bus and is typically implemented with a two-wire interface employing data and clock lines. The $I^2C$ bus allows for the communications module 58 to transmit commands and other information to the driver module 56 using a set of commands understood by both the driver module 56 and the communications module 58. Other available buses include: a serial peripheral interface (SPI) bus, Dallas Semiconductor Corporation's 1-Wire serial bus, a universal serial bus (USB), an RS-232, Microchip Technology Incorporated's UNI/O®, and the like.

In response to receiving updated driver program code, the communications module 58 is configured to send an update command to the driver module 56 on the communication bus 64. The driver module 56 is configured to erase the driver program code in the memory of driver module 56 in response to the update command. Once the driver module 56 is finished erasing the driver program code from the memory, the driver module 56 may send an erase acknowledgment to the communications module 58 over the communication bus 64. In response to the erase acknowledgment, the communications module 58 may send the updated driver program code to the driver module 56 over the communication bus 64. The driver module 56 is configured to write the updated driver program code received from the communications module 58 over the communication bus 64 in the memory of the driver module 56. Once the updated driver program code has been written in the memory of the driver module 56, the driver module may reset and begin executing the updated driver program code.

The driver module 56 shown in FIG. 8 is configured to execute the driver program code, wherein the driver program code causes the driver module 56 to generate a drive output 68. The drive output 68 is output to the LED array 20 and is operable to drive the LEDs within the LED array 20. The driver program code may thus instruct the driver module 56 to drive the LEDs in the LED array 20 so as to provide lighting control functionality. More specifically, the driver program code may direct the operations of the driver module 56 to provide lighting control functionality by adjusting the drive output 68 to the LED array 20. For example, the driver program code may direct the operations of the driver module 56 to adjust the drive output 68 so as to set a dimming level of the LEDs, a color temperature of the LEDs, and/or turn the LEDs on and off.

The driver program code may also direct the operation of the driver module 56 to provide other types of ancillary functionality when the driver module 56 is providing the drive output 68 to the LEDs. For example, in this embodiment, the driver module 56 is configured to collect data from an ambient light sensor $S_A$ and an occupancy sensor $S_O$ and drive the LEDs of the LED array 20. The data collected from the ambient light sensor $S_A$ and the occupancy sensor $S_O$, as well as any other operational parameters of the driver module 56, may be shared with the communications module 58. As such, the communications module 58 may collect data about the configuration or operation of the driver module 56, as well as any information made available to the driver module 56 by the LED array 20, the ambient light sensor $S_A$, and the occupancy sensor $S_O$. The collected data may be used by the communications module 58 to control how the driver module 56 operates, may be shared with other lighting fixtures or control entities through the communications module 58, or may be processed to generate instructions that are sent to other lighting fixtures. The updated driver program code may be provided to fix bugs or add different or new functionality to the driver module 56, including either new or different lighting control functionality or ancillary functionality.

In this embodiment, the driver module 56 includes sufficient electronics to process an alternating current (AC) input signal (AC IN) and provide an appropriate rectified or direct current (DC) signal sufficient to power the communications module 58, and perhaps the LED array 20. As such, the communications module 58 does not require separate AC-to-DC conversion circuitry to power the electronics residing therein, and can simply receive DC power from the driver module 56 over the power bus 66, which may be separate from the communication bus 64 or may be integrated with the communication bus 64, as will be described below. Thus, in this embodiment, the driver program code may be operable to cause the driver module 56 to operate a switching circuit (such as a bridge circuit and/or a charge pump) to convert an AC input signal to a DC power signal on the power bus 66. However, it should be noted that in alternative embodiments, the AC-to-DC conversion circuitry is provided separately from the driver module 56. As such, the driver module 56 may instead receive DC power from separate AC-to-DC conversion circuitry, and the separate AC-to-DC conversion circuitry may or may not be controlled by the driver program code. Furthermore, in one embodiment, the driver program code may additionally cause the driver module 56 to drive battery backup circuitry (not shown) to keep the LEDs of the LED array 20 turned on if there is a power failure that results in the termination of the AC input signal. The driver program code may be provided through a single set of code that implements a conglomerate of some set of the one or more functions described herein. Alternatively, the driver program code could also be divided into various sets of code wherein each set implements one or more different functions. For example, one set of code may handle generating the drive output 68, while another set of code may handle bus communications and other functionality. Each of these sets of code may be programmed either at the same time or separately. By using different sets of code, less memory may be needed by the communications module 58 to update the driver program code. Additionally, using different sets of code for the driver program code can also decrease how long the LEDs are turned off during an update.

Referring again to FIG. 8, in one embodiment, one aspect of the standard communication interface is the definition of a standard power delivery system. For example, the power bus 66 may be set to a low voltage level, such as 5 volts, 12 volts, 24 volts, or the like. The driver module 56 is configured to process the AC input signal to provide the defined low voltage level and provide that voltage over the power bus 66; thus, the communications module 58 or auxiliary devices may be designed in anticipation of the desired low voltage level being provided over the power bus 66 by the driver module 56 without concern for connecting to or converting the AC input signal to the DC power signal for powering the electronics of the communications module 58.

Figure 9:
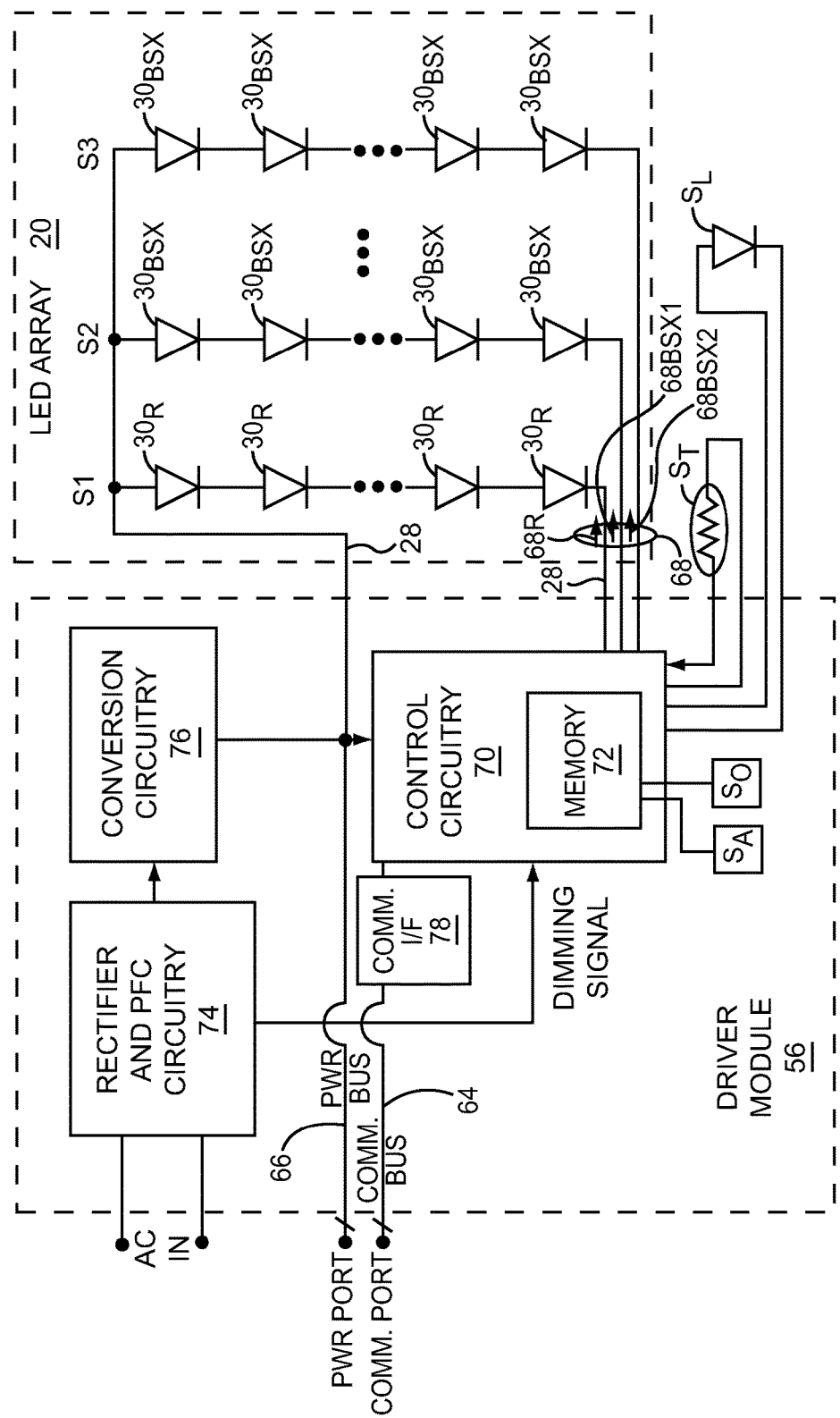
FIG. 9 illustrates one embodiment of the driver module illustrated in FIG. 8 operably associated with one embodiment of the LED array illustrated in FIG. 8.

FIG. 9 illustrates one embodiment of the driver module 56 illustrated in FIG. 8 operably associated with one embodiment of the LED array 20 illustrated in FIG. 8. The driver module 56 depicted in FIG. 9 includes control circuitry 70, memory 72, rectifier and power factor correction (PFC) circuitry 74, and conversion circuitry 76. The memory 72 stores the driver program code and is executed by the control circuitry 70. The LED array 20 may be electrically divided into two or more strings of series-connected LEDs 30. As depicted, there are three LED strings S1, S2, and S3. For clarity, the reference number "30" will include a subscript indicative of the color of the LED 30 in the following text where "R" corresponds to red, "BSY" corresponds to blue shifted yellow, "BSG" corresponds to blue shifted green, and "BSX" corresponds to either BSG or BSY LEDs. LED string S1 includes a number of red LEDs $30_R$, LED string S2 includes a number of either BSY or BSG LEDs $30_{BSX}$, and LED string S3 includes a number of either BSY or BSG LEDs $30_{BSX}$.

The control circuitry 70 is configured to generate the drive output 68. In particular, the control circuitry 70 of the driver module 56 is configured to execute the driver program code in the memory 72, which causes the control circuitry 70 of the driver module 56 to generate the drive output 68. The driver program code in the memory 72 may thus instruct the control circuitry 70 of the driver module 56 to drive the LEDs so as to provide lighting control functionality, along with the ancillary functionality. The driver program code in the memory 72 is thus executable by the control circuitry 70 so as to instruct the control circuitry 70 how to generate the drive output 68.

In this embodiment, the drive output 68 includes drive signal $68_R$, drive signal $68_{BSX1}$, and drive signal $68_{BSX2}$. The drive signal $68_R$ is generated by the control circuitry 70 so as to drive the red LEDs $30_R$ in the LED string S1. More specifically, the drive signal 68R is operable to drive a current to the red LEDs $30_R$ in the LED string S1. The drive signal $68_{BSX1}$ is generated by the control circuitry 70 so as to drive the LEDs $30_{BSX}$ in the LED string S2. More specifically, the drive signal $68_{BSX1}$ is operable to drive a current to the LEDs $30_{BSX}$ in the LED string S2. The drive signal $68_{BSX2}$ is generated by the control circuitry 70 so as to drive the LEDs $30_{BSX}$ in the LED string S3. More specifically, the drive signal $68_{BSX2}$ is operable to drive a current to the LEDs $30_{BSX}$ in the LED string S3. As such, the control circuitry 70 of the driver module 56 controls the current delivered to the respective LED strings S1, S2, and S3.

The control circuitry 70 is configured to adjust the drive output 68 and thereby regulate power to the LEDs 30 in the LED strings S1, S2, and S3. In this embodiment, the drive signal $68_R$, the drive signal $68_{BSX1}$, and the drive signal $68_{BSX2}$ may each be pulse width modulated (PWM). As such, a duty cycle of each of the drive signal $68_R$, the drive signal $68_{BSX1}$, and the drive signal $68_{BSX2}$ can be set to adjust an intensity of the light emitted from the LEDs 30 in the corresponding LED strings S1, S2, and S3.

The BSY or BSG LEDs $30_{BSX}$ in the second LED string S2 may be selected to have a slightly more bluish hue (a less yellowish or greenish hue) than the BSY or BSG LEDs $30_{BSX}$ in the third LED string S3. As such, the drive signal $68_{BSX1}$ and the drive signal $68_{BSX2}$ may each be operable to generate the current flowing through the second and third LED strings S2 and S3, respectively, so that the current is tuned to control the yellowish or greenish light that is effectively emitted by the BSY or BSG LEDs $30_{BSX}$ of the second and third LED strings S2, S3. Controlling the relative intensities of the yellowish or greenish light emitted from the differently hued BSY or BSG LEDs $30_{BSX}$ of the second and third LED strings S2, S3 allows the hue of the combined yellowish or greenish light from the second and third LED strings S2, S3 to be controlled in a desired fashion.

The driver program code may instruct the control circuitry 70 to set the duty cycle of each of the drive signal $68_R$, the drive signal $68_{BSX1}$, and the drive signal $68_{BSX2}$ to implement various types of lighting control functionality. For example, a ratio of current provided through the red LEDs $30_R$ of the first LED string S1 relative to the currents provided through the BSY or BSG LEDs $30_{BSX}$ of the second and third LED strings S2 and S3 may be adjusted by the driver program code to set the duty cycles of each of the drive signal $68_R$, the drive signal $68_{BSX1}$, and the drive signal $68B_{SX2}$ This allows the driver module 56 to effectively control the relative intensities of the reddish light emitted from the red LEDs $30_R$ and the combined yellowish or greenish light emitted from the various BSY or BSG LEDs $30_{BSX}$. As such, the intensity and the color point of the yellowish or greenish light from BSY or BSG LEDs $30_{BSX}$ can be set relative to the intensity of the reddish light emitted from the red LEDs $30_R$. The resultant yellowish or greenish light mixes with the reddish light to generate white light that has a desired color temperature and falls within a desired proximity of a BBL.

Notably, the number of LED strings Sx may vary from one to many and different combinations of LED colors may be used in the different strings. Each LED string Sx may have LEDs 30 of the same color, variations of the same color, or substantially different colors, such as red, green, and blue. In one embodiment, a single LED string Sx may be used, wherein the LEDs in the LED string Sx are all substantially identical in color, vary in substantially the same color, or include different colors. In another embodiment, three LED strings Sx with red, green, and blue LEDs may be used, wherein each LED string Sx is dedicated to a single color. In yet another embodiment, at least two LED strings Sx may be used, wherein different colored BSY LEDs are used in one of the LED strings Sx and red LEDs are used in the other of the LED strings Sx. Accordingly, the number of drive signals in the drive output 68 may vary in accordance with the number of LED strings Sx and the particular control scheme being implemented to control the LEDs in the LED strings Sx.

In this embodiment, the driver module 56 depicted in FIG. 9 generally includes the rectifier and PFC circuitry 74 and the conversion circuitry 76 to provide power on the power bus using the AC power signal. More specifically, the rectifier and PFC circuitry 74 is adapted to receive the AC power signal, rectify the AC power signal, and correct the power factor of the AC power signal. The resultant signal is provided to the conversion circuitry 76, which converts the rectified AC power signal to a DC power signal. The DC power signal may be boosted or bucked to one or more desired DC voltages by DC-DC converter circuitry, which may be provided by the conversion circuitry 76. Internally, the DC power signal may be used to power the control circuitry 70 and any other circuitry provided in the driver module 56.

The DC power signal is also provided to the power bus 66, which is coupled to one or more power ports, which may be part of the standard communication interface. The DC power signal provided to the power bus 66 may be used to provide power to one or more external devices that are coupled to the power bus and separate from the driver module 56. These external devices may include the communications module 58 and any number of auxiliary devices, which are discussed further below. Accordingly, these external devices may rely on the driver module 56 for power and can be efficiently and cost-effectively designed accordingly. The rectifier and PFC circuitry 74 and the conversion circuitry 76 of the driver module 56 are robustly designed in anticipation of being required to supply power to not only its internal circuitry and the LED array 20, but also to supply power to these external devices. Such a design greatly simplifies the power supply design, if not eliminating the need for a power supply, and reduces the cost for these external devices.

As illustrated, the DC power signal may be provided to another port, which will be connected by the cabling 28 to the LED array 20. In this embodiment, the supply line of the DC power signal is ultimately coupled to a first end of each of the LED strings S1, S2, and S3 in the LED array 20. The control circuitry 70 is coupled to a second end of each of the LED strings S1, S2, and S3 by the cabling 28 to provide the drive output 68 to the LEDs 30 in the LED array 20. Based on any number of fixed or dynamic parameters, the control circuitry 70 may adjust the pulse width modulation of the drive signal $68_R$, the drive signal $68_{BSX1}$, and the drive signal $68_{BSX2}$, such that the resultant white light emitted from the LED strings S1, S2, and S3 has a desired color temperature and falls within a desired proximity of the BBL. In particular, the driver program code may cause the control circuitry 70 of the driver module 56 to regulate power and thus the pulse width modulated current that flows through the respective LED strings S1, S2, and S3 based on the fixed or dynamic parameters. Certain of the many variables that may impact the current provided to each of the LED strings S1, S2, and S3 include: the magnitude of the AC power signal, the resultant white light, and the thermal temperature of the driver module 56 or the LED array 20. Notably, the architecture used to drive the LED array 20 in this embodiment is merely exemplary, as those skilled in the art will recognize other architectures for controlling the drive voltages and currents presented to the LED strings S1, S2, and S3.

In certain instances, a dimming device controls the AC power signal. The rectifier and PFC circuitry 74 may be configured to detect the relative amount of dimming associated with the AC power signal and provide a corresponding dimming signal to the control circuitry 70. Based on the dimming signal, the control circuitry 70 will adjust the current provided to each of the LED strings S1, S2, and S3 to effectively reduce the intensity of the resultant white light emitted from the LED strings S1, S2, and S3 while maintaining the desired color temperature. Dimming instructions may alternatively be delivered from the communications module 58 to the control circuitry 70 in the form of a command via the communication bus 64.

The intensity or color of the light emitted from the LEDs 30 may be affected by ambient temperature. If associated with a thermistor $S_T$ or other temperature-sensing device, the control circuitry 70 can control the current provided to each of the LED strings S1, S2, and S3 based on ambient temperature in an effort to compensate for adverse temperature effects. The intensity or color of the light emitted from the LEDs 30 may also change over time. If associated with an LED light sensor $S_L$, the control circuitry 70 can measure the color of the resultant white light being generated by the LED strings S1, S2, and S3 and adjust the current provided to each of the LED strings S1, S2, and S3 to ensure that the resultant white light maintains a desired color temperature or other desired metric. The control circuitry 70 may also monitor the output of the occupancy and ambient light sensors $S_O$ and $S_A$ for occupancy and ambient light information.

The control circuitry 70 may include memory 72 to enable the control circuitry 70 to bidirectionally communicate with the communications module 58 or other devices over the communication bus 64 through an appropriate communication interface (I/F) 78 using one or more defined protocols, such as an I²C protocol or the standard protocols discussed above. Alternatively, the communication I/F 78 may be included within the control circuitry 70. The control circuitry 70 may receive instructions from the communications module 58 or other device and take appropriate action to implement the received instructions. The instructions may range from controlling how the LEDs 30 of the LED array 20 are driven to returning operational data, such as thermal temperature, occupancy, light output, or ambient light information, that was collected by the control circuitry 70 to the communications module 58 or other device via the communication bus 64. The control circuitry 70 may be or may include one or more microcontrollers, one or more microprocessors, one or more programmable gate arrays, one or more programmable logic controllers, one or more finite-state machines, combinations of any of these devices, and/or the like.

Figure 10:
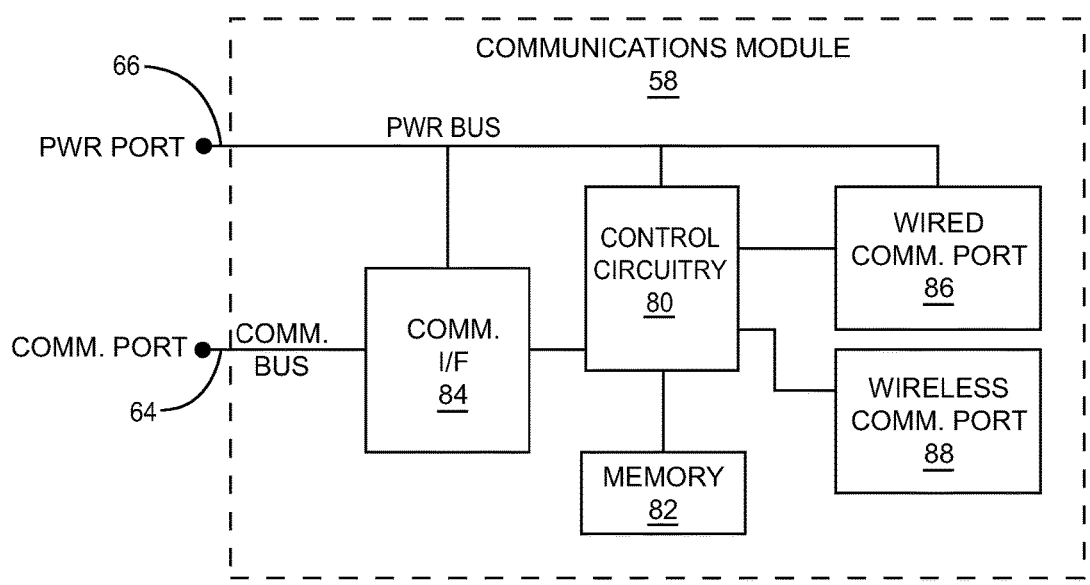
FIG. 10 is a block diagram of a communications module according to one embodiment of the disclosure.

With reference to FIG. 10, a block diagram of one embodiment of the communications module 58 is illustrated. The communications module 58 includes a control circuitry 80 and memory 82 that stores data and executable code to facilitate operation as described herein. The control circuitry 80 may be associated with a communication I/F 84, which is to be coupled to the driver module 56 (shown in FIG. 8), directly or indirectly via the communication bus 64. The communication I/F 84 may be configured to receive and send instructions and other data in accordance with the protocol for the communication bus 64, such as the I²C protocol. In alternative embodiments, the communication I/F 84 is included within the control circuitry 80. The control circuitry 80 may also be associated with a wired communication port 86, a wireless communication port 88, or both, to facilitate wired or wireless communications with other lighting fixtures and remote devices (such as the remote device 60 shown in FIG. 8). As such, the communications module 58 is configured to receive updated driver program code from the remote device 60 (shown in FIG. 8) at the wired communication port 86 and/or the wireless communication port 88 in accordance with the communication link being utilized to connect to the remote device 60. As explained in further detail below, the memory 82 may be used to help maintain the integrity of the updated driver program code received from the remote device 60 before being transferred to the driver module 56 (shown in FIG. 8) over the communication bus 64. The control circuitry 80 may be or may include one or more microcontrollers, one or more microprocessors, one or more programmable gate arrays, one or more programmable logic controllers, one or more finite-state machines, combinations of any of these devices, and/or the like.

The capabilities of the communications module 58 may vary greatly from one embodiment to another. For example, the communications module 58 may act as a simple bridge between the driver module 56 and the other lighting fixtures or remote control entities. In such an embodiment, the control circuitry 80 will primarily pass data and instructions received from the other lighting fixtures or remote control entities to the driver module 56, and vice versa. The control circuitry 80 may translate the instructions as necessary based on the protocols being used to facilitate communications between the driver module 56 and the communications module 58 as well as between the communications module 58 and the remote control entities. In other embodiments, the control circuitry 80 plays an important role in coordinating intelligence and sharing data among the lighting fixtures 10 as well as providing significant, if not complete, control of the driver module 56. While the communications module 58 may be able to control the driver module 56 by itself, the control circuitry 80 may also be configured to receive data and instructions from the other lighting fixtures 10 or remote control entities and use this information to control the driver module 56. The communications module 58 may also provide instructions to other lighting fixtures 10 and remote control entities based on the sensor data from the driver module 56, as well as sensor data and instructions received from the other lighting fixtures and remote control entities.

Power for the control circuitry 80, the memory 82, the communication I/F 84, the wired communication port 86, and the wireless communication port 88 may be provided over the power bus 66 via the power port (PWR PORT). As noted above, the power bus 66 may receive its power from the driver module 56, which generates the DC power signal. As such, the communications module 58 may not need to be externally connected to AC power or include the rectifier and PFC circuitry 74. The power port and the communication port may be separate or may be integrated with the standard communication interface. The power port and communication port are shown separately for clarity. The communication bus 64 may take many forms. In one embodiment, the communication bus 64 is a 2-wire serial bus, wherein the connector or cabling configuration may be configured such that the communication bus 64 and the power bus 66 are provided using four wires: data, clock, power, and ground. With regard to the memory 82 of the communications module 58, the memory 82 may have any number of memory storage devices to store the various instructions and data to provide the above-described communications functionality.

Figure 11:
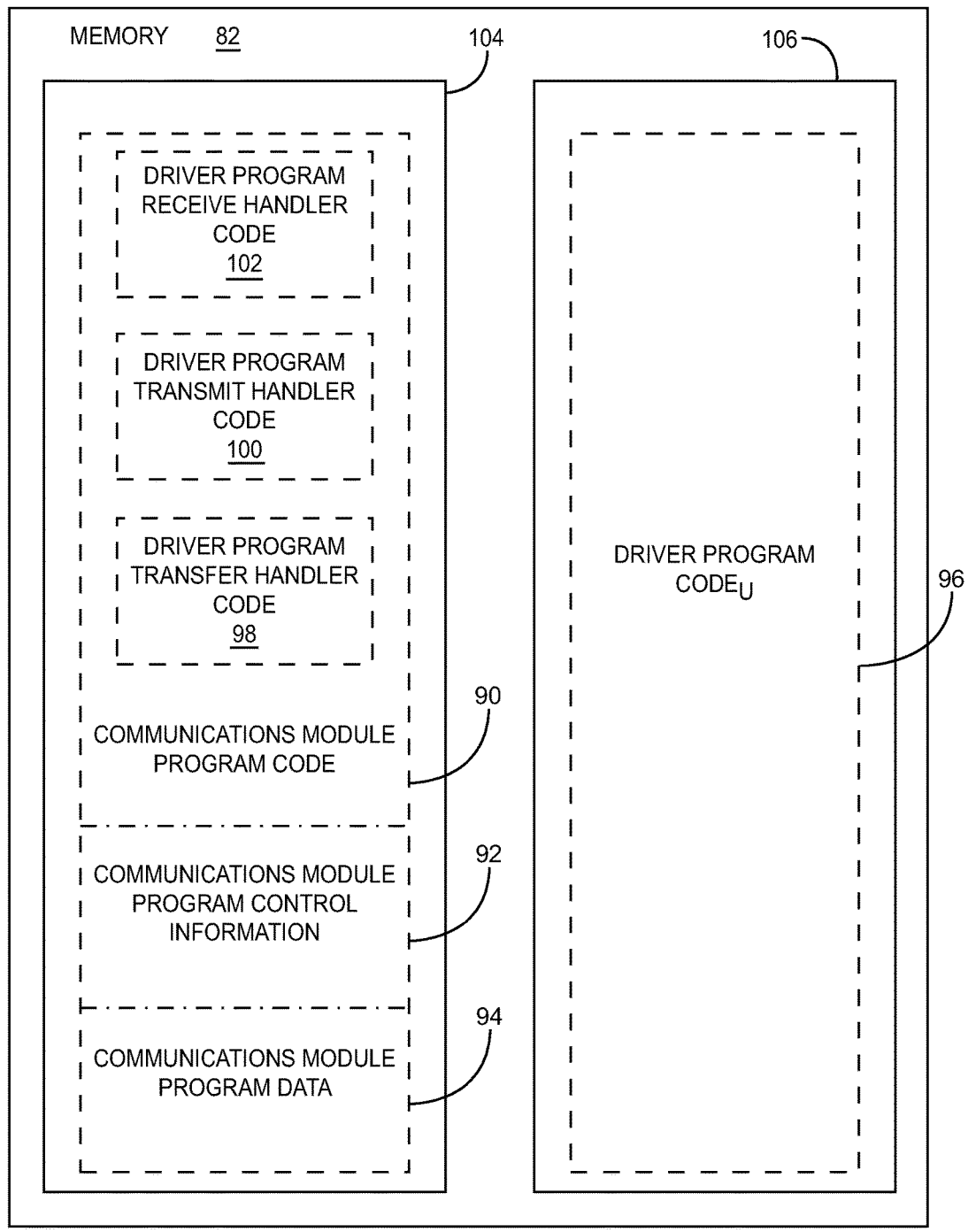
FIG. 11 is a diagram illustrating one embodiment of the memory in the communications module shown in FIG. 10.

FIG. 11 is a diagram illustrating one embodiment of the memory 82 in the communications module 58 shown in FIG. 10. The memory 82 of the communications module 58 has been partitioned to have different memory segments. In this embodiment, the memory 82 is partitioned to a memory segment 90 operable to store communications module program code, a memory segment 92 operable to store communications module program control information, a memory segment 94 operable to store communications module program data, and a memory segment 96 operable to store the updated driver program code, which is from now on described as the driver program code$_U$.

The communications module program code in the memory segment 90 is executable by the control circuitry 80 (shown in FIG. 10), which causes the control circuitry 80 of the communications module 58 (shown in FIG. 8) to implement a communications module program and provide the communications functionality described above. In this particular embodiment, the communications module program code in the memory segment 90 includes driver program transfer handler code 98, driver program transmit handler code 100, and driver program receive handler code 102. Note that the driver program receive handler code 102, the driver program transmit handler code 100, and the driver program transfer handler code 98 are not intended to be an exhaustive or limiting list of the various types of instructions that may form part of the communications module program code.

In this embodiment, the driver program receive handler code 102 may cause the control circuitry 80 to implement a driver program receive handler program. When the driver program receive handler program is implemented by the control circuitry 80, the communications module 58 is configured to receive the updated driver program code$_U$ from the remote device 60 (shown in FIG. 8) or other remote devices, such as other lighting fixtures, and to store the driver program code$_U$ in the memory segment 96. The driver program receive handler program may also implement one or more integrity checks on the driver program code$_U$ from the remote device 60, such as parity checks, checksums, and/or the like. In this manner, the driver program code$_U$ in the memory segment 96 of the memory 82 is much more likely to be correct prior to sending the driver program code$_U$ to the driver module 56 (shown in FIG. 8). The communications module 58 (shown in FIG. 9) is configured to send the driver program code$_U$ assembled in the memory 82 to the driver module 56.

In this embodiment, the memory 82 includes a first memory storage device 104 and a second memory storage device 106. The first memory storage device 104 includes the memory segment 90, the memory segment 92, and the memory segment 94. The memory segment 96 is in the second memory storage device 106. The memory segment 90, the memory segment 92, and the memory segment 94 deal with code and information for implementing programs. By providing the memory segment 96 in the second memory storage device 106, program memory does not need to be used to store the driver program code$_U$. Rather, by partitioning the memory segment 96 in the second memory storage device 106, the second memory storage device 106 provides a memory buffer with additional memory space dedicated to storing the driver program code$_U$. However, in alternative embodiments, one or more of the memory segment 90, the memory segment 92, and the memory segment 94 may be provided in separate memory storage devices within the memory 82, and/or the memory segment 96 may be provided in the same memory storage device as the other memory storage devices.

The driver program transmit handler code 100 may cause the control circuitry 80 (shown in FIG. 10) to implement a driver program transmit handler program. The driver program transmit handler program is operable to cause the communications module 58 to transmit the driver program code$_U$ to other remote devices, such as other lighting fixtures within the lighting network. In contrast, the driver program transfer handler code 102 may cause the control circuitry 80 (shown in FIG. 10) to implement a driver program transfer program. The driver program transfer program is operable to cause the communications module 58 to transfer the driver program code$_U$ stored in the memory segment 96 to the driver module 56 (shown in FIG. 8).

Figure 12:
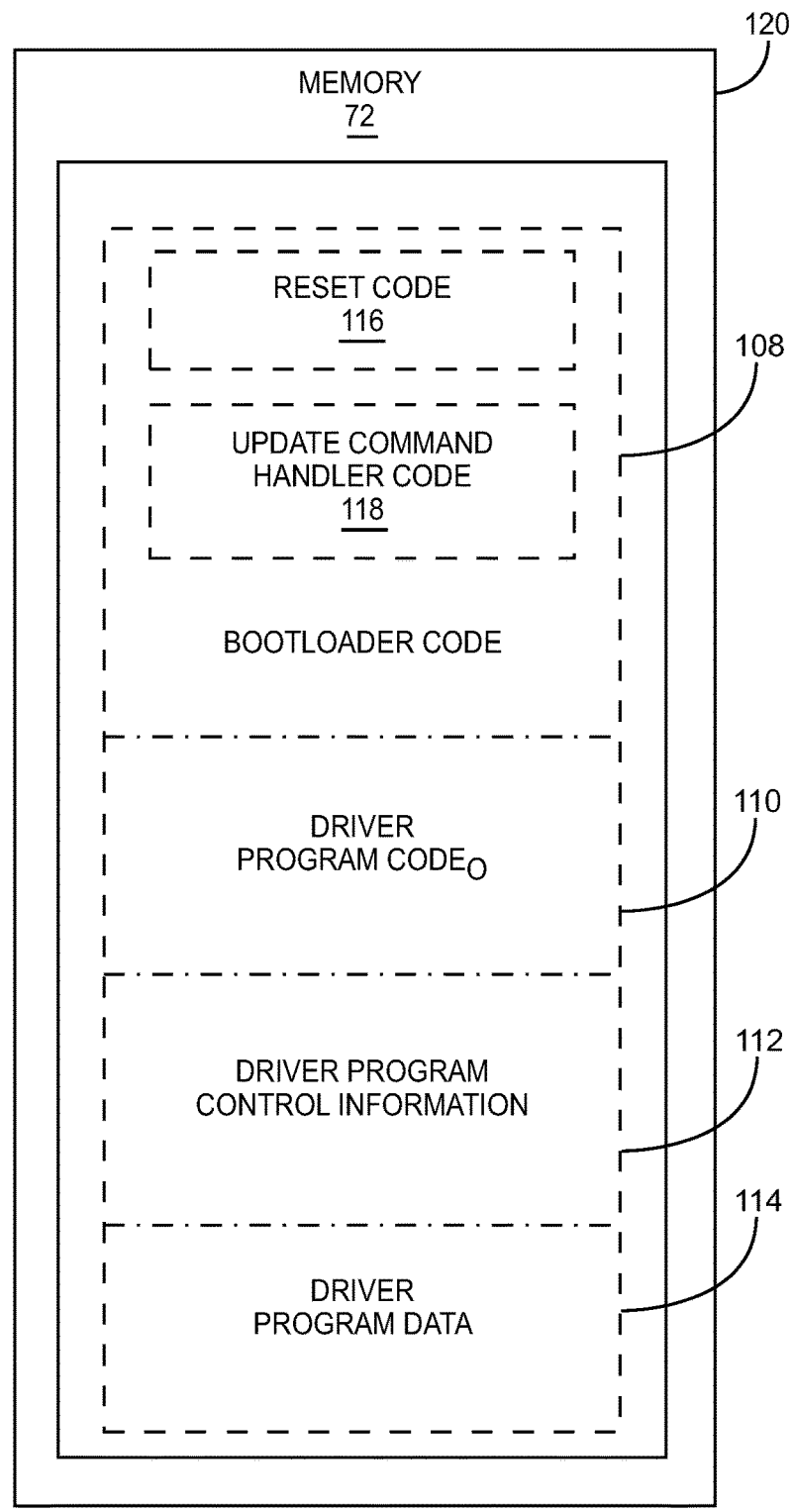
FIG. 12 illustrates one embodiment of the memory in the control circuitry of the driver module shown in FIG. 9.

FIG. 12 illustrates one embodiment of the memory 72 in the control circuitry 70 of the driver module 56 shown in FIG. 9. In this embodiment, the memory 72 has been partitioned into a bootloader memory segment 108, a program memory segment 110, a memory segment 112, and a memory segment 114. The bootloader memory segment 108 is operable to store bootloader code. The program memory segment 110 is operable to store the driver program code, and in this embodiment is shown storing driver program code$_O$ prior to update. The memory segment 112 is operable to store driver program control information, which is control information used to implement the driver program code, in this case, the driver program code$_O$ stored in the program memory segment 110. The memory segment 114 is operable to store driver program data, which is information related to the lighting control functionality and auxiliary functionality provided by the driver module 56 (shown in FIG. 8).

The bootloader code in the bootloader memory segment 108 is executable by the control circuitry 70 to reset the driver module 56. When resetting the control circuitry 70, the control circuitry 70 is bootstrapped in order to execute the driver program code (which in FIG. 12 is the driver program code$_O$) in the program memory segment 110. In this particular embodiment, the bootloader code includes reset code 116, which is executable by the control circuitry 70 to reset the control circuitry 70. In this embodiment, the bootloader code also includes update command handler code 118. The update command handler code 118 is configured to implement update procedures to update the driver program code$_O$ within the program memory segment 110 with the driver program code$_U$ (shown in FIG. 11) from the communications module 58 (shown in FIG. 10). It should be noted that the bootloader code in the bootloader memory segment 108 may include various additional sets of code.

For example, the bootloader code may include sets of command code so that the control circuitry 80 implements a Set Address Pointer Command to set an address pointer, a Get Address Pointer Command to retrieve the address pointer, a Download Command to download information received over the communication bus 64 (shown in FIG. 9), an Upload Command to send information over the communication bus 64 (shown in FIG. 9), a bootloader read command to read from the memory 72, a bootloader write command to write into the memory 72, and a bootloader jump command to jump to a memory location within memory 72. The sets of code for these commands may be utilized by the reset code 116 and the update command handler code 118 to provide desired functionality. The sets of code for the commands may be provided in accordance with the protocol for the communication bus 64, such as the I$^2$C protocol. As such, the bootloader code in the bootloader memory segment 108 allows for instructions and commands to be received and sent to and from the driver module 56 (shown in FIG. 9) over the communication bus 64. In this embodiment, the memory 72 is provided by a memory storage device 120, such as a flash memory storage device.

Alternatively, one or more of the memory segments 108, 110, 112, 114 may be provided on separate memory storage devices in the memory 72.

Figure 13A:
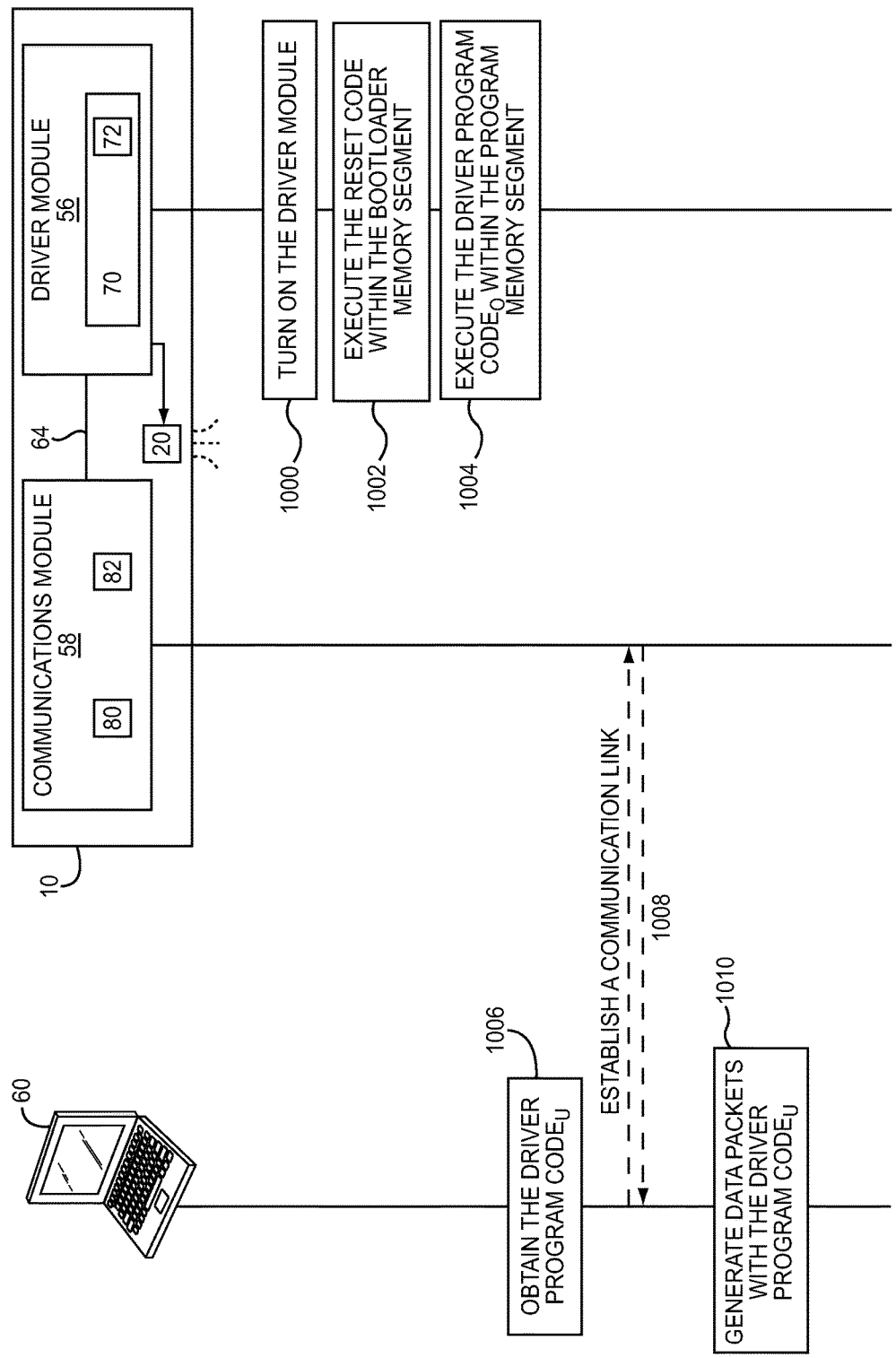
FIGS. 13A and 13B illustrate one embodiment of exemplary procedures that may be implemented by the lighting fixture and a remote device in relation to activating the lighting fixture and transferring updated driver program code from the remote device to the lighting fixture.

Referring now to FIGS. 9-13B, FIGS. 13A and 13B illustrate one embodiment of procedures that may be implemented by the lighting fixture 10 and the remote device 60 in relation to activating the lighting fixture 10 and transferring the driver program code$_U$ from the remote device 60 to the lighting fixture 10. Initially, the lighting fixture 10 may turn on the driver module 56 (FIG. 13A, procedure 1000). In this manner, the driver module 56 is activated to turn on power. The driver module 56 may be turned on as a result of closing of one or more switches so that the AC input signal is received by the driver module 56. Once the driver module 56 is turned on, the control circuitry 70 of the driver module 56 executes the reset code 116 that is within the bootloader memory segment 108 (FIG. 13A, procedure 1002). In this embodiment, the reset code 116 is at a beginning of the bootloader memory segment 108. The reset code 116 may cause the control circuitry 70 to reset the driver module 56.

For example, the reset code 116 may cause the control circuitry 70 to bootstrap and initialize a program counter, address pointers, and other driver program control information in the memory segment 112 utilized to execute the driver program code (such as the driver program code$_O$), along with other bootstrapping routines. After the control circuitry 70 executes the reset code 116, the control circuitry 70 executes the driver program code (such as the driver program code$_O$) in the program memory segment 110. Since the driver program code$_O$ is currently in the program memory segment 110, the control circuitry 70 executes the driver program code$_O$ within the program memory segment 110 (FIG. 13A, procedure 1004).

At some point, the remote device 60 (which in this example is a desktop computer) obtains the driver program code$_U$ (FIG. 13A, procedure 1006). To obtain the driver program code$_U$, the driver program code$_U$ may have been originated at the remote device 60. Thus, the remote device 60 may have compiled a source file on order to generate the driver program code$_U$. On the other hand, the remote device 60 may simply have received the driver program code$_U$ from another remote device. For example, the remote device 60 may be programmed to receive updates for the driver program code (such as the driver program code$_U$) via a public computer network, such as the Internet, and/or a mobile communications network.

If no communication link has previously been established between the remote device 60 and the communications module 58, the remote device 60 and the communications module 58 of the lighting fixture 10 establish a communication link (FIG. 13A, procedure 1008). Thus, the remote device 60 and the communications module 58 of the lighting fixture 10 may each implement handshaking procedures to establish the communication link. Both the remote device 60 and the communications module 58 of the lighting fixture 10 may be configured to initiate the establishment of this communication link. As explained above, the communication link may be a communication link for any type of suitable communications service, and thus may be set up in accordance with any suitable communications protocol. Generally, however, information may be sent over the communication link in data packets formatted in accordance with the communications protocol of the communication link.

To send the driver program code$_U$ to the lighting fixture 10 over the communication link, the remote device 60 may generate data packets with the driver program code$_U$ (FIG. 13A, procedure 1010). Since the data packets are formatted in accordance with the communications protocol of the communication link, the data packets have payload data frames, wherein each of the payload data frames has a payload data frame size set in accordance with the communications protocol. If each of the data packets includes a single one of the payload data frames, the payload data frames bijectively correspond with the data packets. Generally, the payload data frame size of the communications protocol is not large enough to include all of the driver program code$_U$. As such, the remote device 60 may divide the driver program code$_U$ into code segments equal to or smaller than the payload data frame size. The code segments are then included the payload data frames of the data packets. Accordingly, each of the payload data frames may include one of the code segments. Note, however, that for various reasons, the payload data frames may or may not bijectively correspond with the code segments. For example, due to errors at either the remote device 60 or the communications module 58, one or more of the code segments may need to be repeated within the payload data frames of the data packets. As such, the code segments may only surjectively correspond onto the payload data frames having the driver program code$_U$.

Figure 13B:
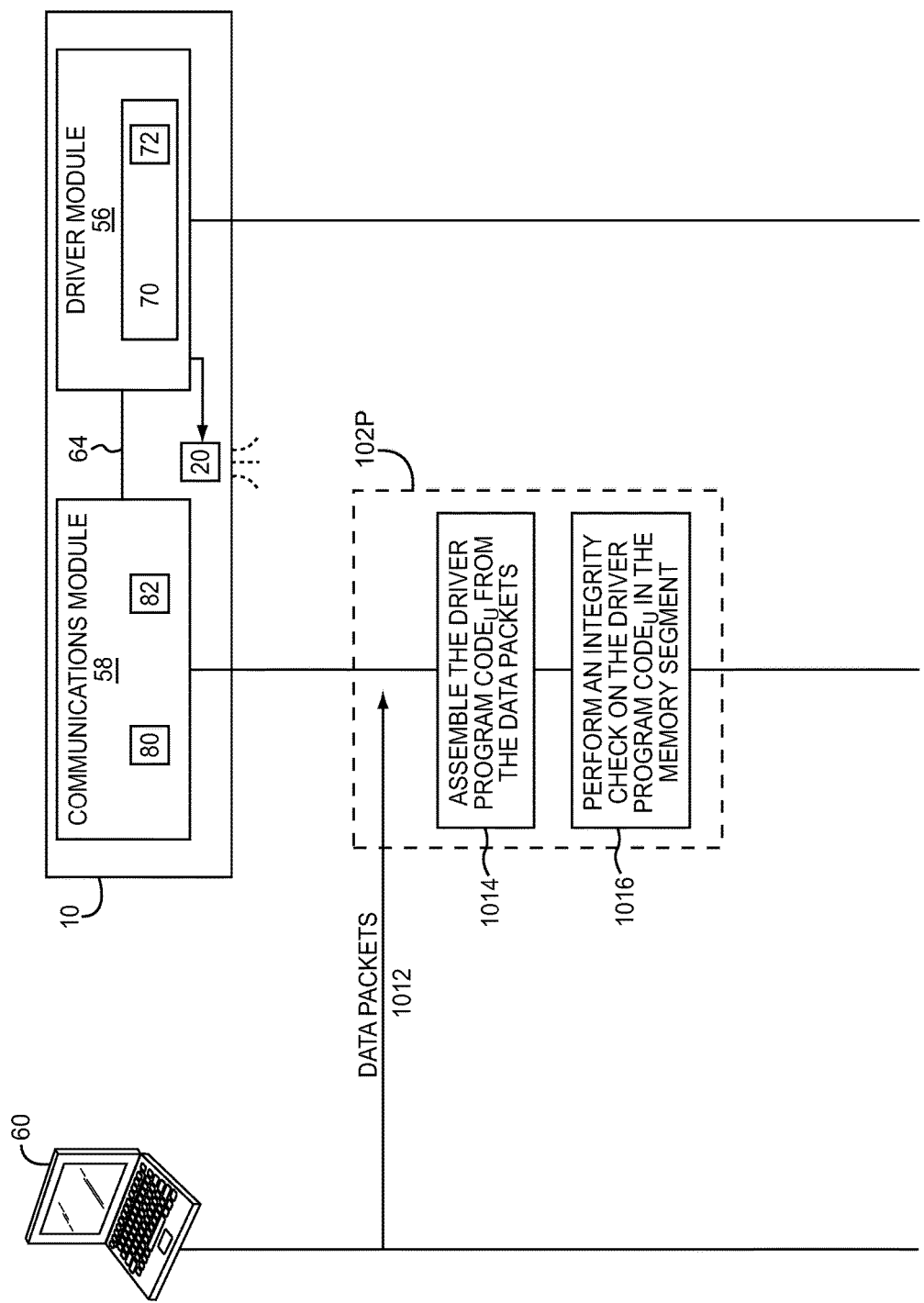

The data packets are transmitted over the communication link to the communications module 58 of the lighting fixture 10 (FIG. 13B, procedure 1012). Accordingly, the remote device 60 sends the data packets over the communication link and the communications module 58 receives the data packets over the communication link. It should be noted that the procedure 1010 and the procedure 1012 may or may not be temporally exclusive. For example, the remote device 60 may generate one of the data packets and then send the data packet over the communication link. Thus, as each one of the data packets is generated, that data packet is sent over the communication link. Alternatively, the remote device 60 may first generate all of the data packets and then send all of the data packets over the communication link.

Next, the control circuitry 80 of the communications module 58 may execute the driver program receive handler code 102 in the memory 82. The driver program receive handler code 102 causes the control circuitry 80 to implement the driver program receive handler program. The procedures of the driver program receive handler program resulting from the execution of the driver program receive handler code 102 are demarcated by number 102P in FIG. 13. As mentioned above, the data packets are formatted in accordance with the communications protocol for the communication link. For example, the communication link may be an RF communication link set up in accordance with a standard RF communications protocol, such as the 802.15.4 protocol. In addition to one (or more) of the payload data frames, each of the data packets may include an update command, a originating device address, a sender device address, a transmitter device address, a total transmission size, a start address in memory, and a payload data frame sequence number. In response to receiving at least one of the data packets with the driver program code$_U$, the communications module 58 may begin executing the driver program receive handler code 102 in the memory 82.

By executing the driver program receive handler code 102 and implementing the driver program receive handler program, the control circuitry 80 of the communications module 58 assembles the driver program code$_U$ from the data packets (FIG. 13B, procedure 1014). It should be noted that the procedure 1012 and the procedure 1014 may or may not be temporally exclusive. For example, the communications module 58 may store the code segment within the payload data frame of the data packet in the memory segment 96 of the memory 82 as each of the data packets is received. Thus, the driver program code$_U$ is assembled as the data packets are received over the communication link. The code segment from the payload data frame of the data packet may be stored in the memory segment 96 based on the other information in the data packet. If there is an error in the data packet, the communications module 58 may also transmit a resend request for the code segment using the other information in the data packet. Alternatively, the data packets are first all received over the communication link, and then the driver program code$_U$ is assembled in the memory segment 96 of the memory 82.

Next, the control circuitry 80 of the communications module 58 performs an integrity check on the driver program code$_U$ in the memory segment 96 of the memory 82 (FIG. 13B, procedure 1016). The other information from the data packets may be used to ensure that all of the code segments of the driver program code$_U$ have been assembled in the memory segment 96. Additionally, the integrity check may ensure that the code segments have been ordered appropriately, and/or that the driver program code$_U$ does not have any errors.

Referring now to FIGS. 9-12 and 14A-14C, FIGS. 14A-14C are related to exemplary procedures for transferring the driver program code$_U$ from the communications module 58 to the driver module 56. When the driver program code$_U$ is received from the remote device 60, the control circuitry 80 begins executing the driver program transfer handler code 98 of the communications module program code. The driver program transfer handler program is implemented from the execution of the driver program transfer handler code 98 by the control circuitry 80 of the communications module 58. The procedures of the driver program transfer handler program are demarcated by number 98P in FIGS. 14A-14C.

Figure 14A:
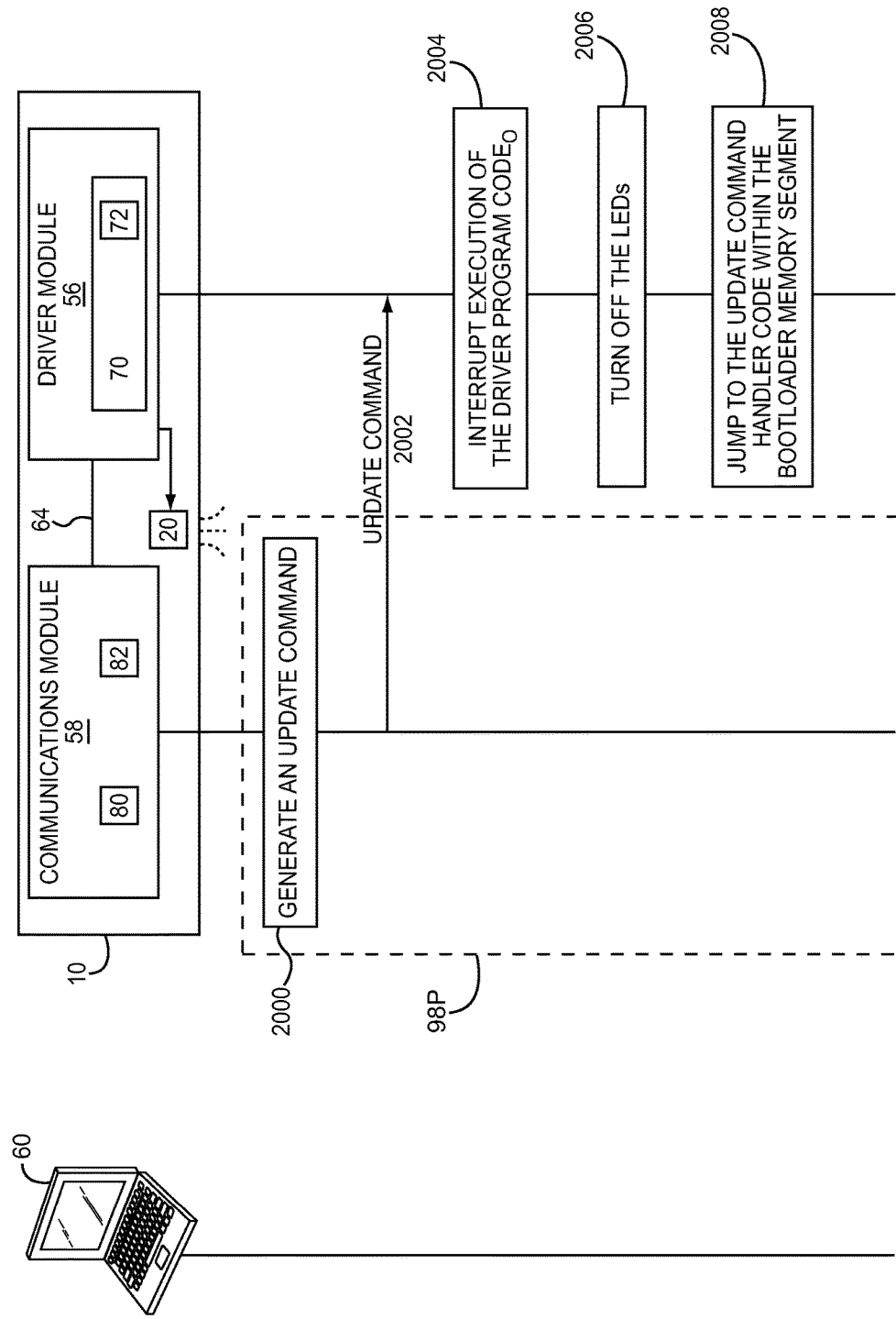
FIGS. 14A-14C illustrate one embodiment of exemplary procedures for updating the driver module with the updated driver program code once the communications module has received the updated driver program code from the remote device.

As shown in FIG. 14A, after receiving the driver program code$_U$ from the remote device 60, the communications module 58 generates an update command (procedure 2000). The update command is then transmitted from the communications module 58 to the driver module 56 over the communication bus 64 (procedure 2002). Accordingly, the communications module 58 sends the update command to the driver module 56 over the communication bus 64 and the driver module 56 receives the update command on the communication bus 64 from the communications module 58. In response to the update command from the communications module 58, the control circuitry 70 of the driver module 56 interrupts execution of the driver program code$_O$ (procedure 2004). Additionally, the control circuitry 70 of the driver module 56 turns off the LEDs in the LED array 20 (procedure 2006). The control circuitry 70 then jumps to the update command handler code 118 within the bootloader memory segment 108 (procedure 2008). Thus, the control circuitry 70 jumps out of the program memory segment 110 with the driver program code$_O$ in the program memory segment 110 of the memory 72 and to the update command handler code 118 within the bootloader memory segment 108.

The control circuitry 70 of the driver module 56 may execute the update command handler code 118 in the memory 72 in response to the update command from the communications module 58. The update command handler code 118 causes the control circuitry 70 of the driver module 56 to implement an update command routine to effectuate the update command from the communications module 58. The procedures of the update command routine resulting from the execution of the update command handler code 118 are demarcated by number 118P in FIGS. 14B and 14C.

Figure 14B:
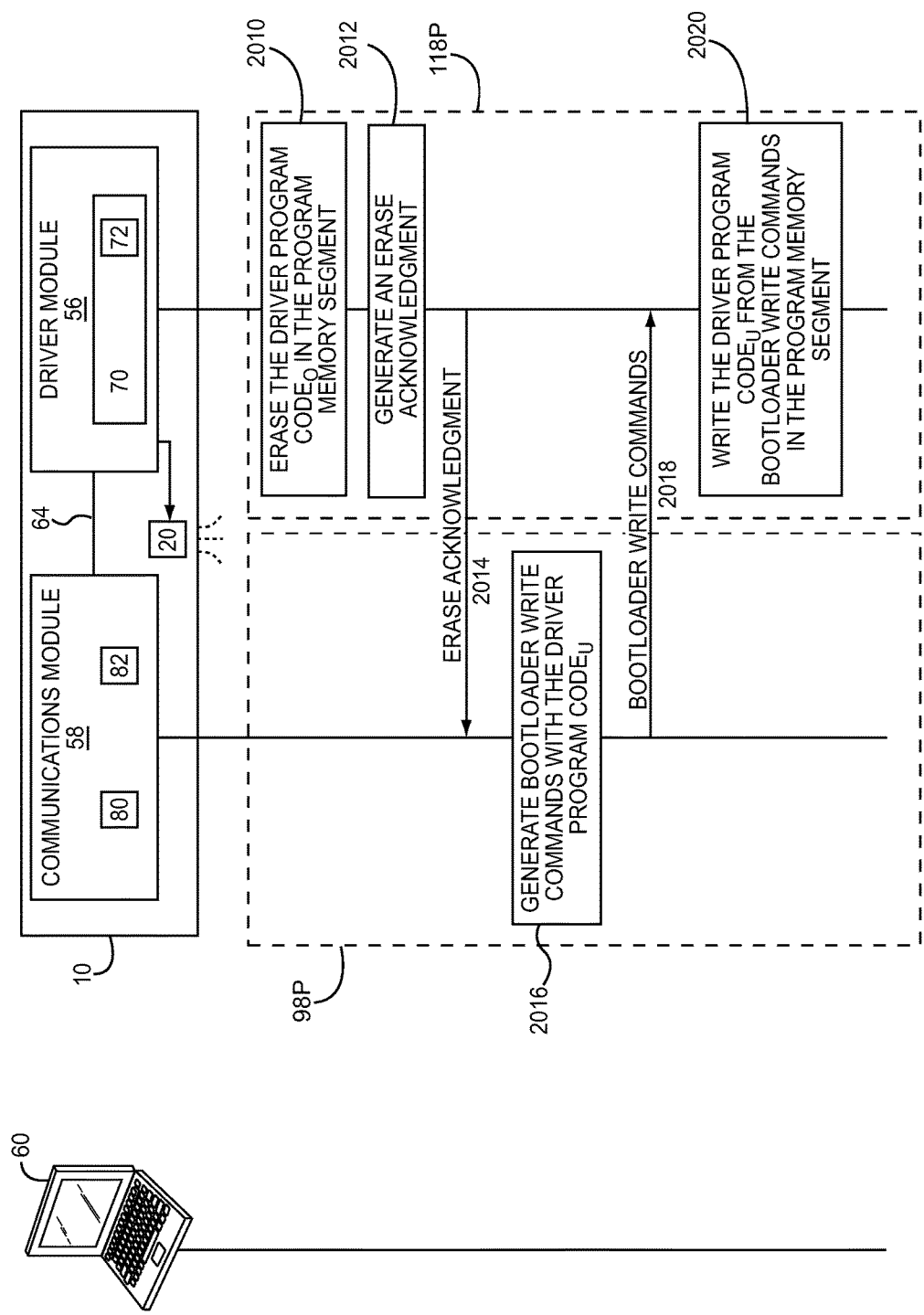

As shown in FIG. 14B, the control circuitry 70 of the driver module 56 is configured to erase the driver program code$_O$ in the program memory segment 110 of the memory 72 in the driver module 56 (procedure 2010). The update command handler code 118 may use the bootloader Erase Command, where the update command routine implements a nested loop of the bootloader Erase Commands to erase the driver program code$_O$ from the program memory segment 110. After erasing the driver program code$_O$, the control circuitry 70 generates an erase acknowledgment (procedure 2012). The erase acknowledgment is transmitted over the communication bus 64 to the communications module 58 (procedure 2014). Accordingly, the driver module 56 sends the erase acknowledgment over the communication bus 64 to the communications module 58 and the communications module 58 receives the erase acknowledgment from the driver module 56 on the communication bus 64. The control circuitry 70 of the driver module 56 then waits.

In response to the erase acknowledgment, the control circuitry 80 of the communications module 58 generates bootloader write commands with the driver program code$_U$ (procedure 2016). The bootloader write commands are transmitted over the communication bus 64 to the driver module 56 of the lighting fixture 10 (procedure 2018). Accordingly, the communications module 58 sends the bootloader write commands over the communication bus 64 and the driver module 56 receives the bootloader write commands over the communication bus 64. It should be noted that the procedure 2016 and the procedure 2018 may or may not be temporally exclusive. For example, the communications module 58 may generate one of the bootloader write commands and then send the bootloader write command over the communication bus 64. Thus, as each one of the bootloader write commands is generated, that bootloader write command is sent over the communication bus 64. Alternatively, the communications module 58 may first generate all of the bootloader write commands and then send all of the bootloader write commands over the communication bus 64.

The bootloader write commands may be formatted in accordance with the bus protocol for the communication bus 64. For example, the communication bus 64 may be an I$^2$C communications bus set up in accordance with an I$^2$C protocol. The bootloader write commands may thus be formatted in accordance with the bus protocol and include various write command arguments, including at least one data frame argument with data to be written by the bootloader write command. Generally, the bus protocol sets the data frame size of the data frame argument. Generally, the data frame size of the bus protocol is not large enough to include all of the driver program code$_U$. As such, the control circuitry 80 of the communications module 58 may divide the driver program code$_U$ into code segments equal to or smaller than the data frame size. The code segments are then included in the data frame arguments of the bootloader write commands. Accordingly, each of the data frame arguments may include one of the code segments. Note, however, that for various reasons, the data frame arguments may or may not bijectively correspond with the code segments. For example, due to errors at either the communications module 58 or the driver module 56, one or more of the code segments may need to be repeated within the data frame arguments of the bootloader write commands. As such, the code segments may only surjectively correspond onto the data frame arguments having the driver program code$_U$.

Each of the bootloader write commands may include a write command identifier, an originating device address, a sender device address, a transmitter device address, a total transmission size, a start address in memory, and a sequence number. In response to receiving at least one of the bootloader write commands with the driver program code$_U$, the communications module 58 may begin executing the bootloader write command in the memory 82.

In response to the bootloader write commands with the driver program code$_U$, the control circuitry 70 writes the driver program code$_U$ from the bootloader write commands in the program memory segment 110 in the memory 72 of the driver module 56 (procedure 2020). By executing the update command handler code 118 and implementing the update command handler routine, the control circuitry 70 of the communications module 58 executes the implements the bootloader write commands (also using the bootloader write command code in the bootloader memory segment 108) until the driver program code$_U$ has been written into the program memory segment 110 in the memory 72. In this manner, the driver program code$_U$ replaces the driver program code$_O$ and the program memory segment 110 of the driver module 56 is updated.

It should be noted that the procedure 2018 and the procedure 2020 may or may not be temporally exclusive. For example, the driver module 56 may store the code segment within the data frame argument of one of the bootloader write commands in the program memory segment 110 of the memory 72 as each of the bootloader write commands is received. Thus, the driver program code$_U$ is assembled as the data packets are received on the communication bus 64. The code segment from the data frame argument of the bootloader write command may be stored in the program memory segment 110 based on the other information in the bootloader write command. If there is an error in the data frame argument, the driver module 56 may also transmit a read command over the communication bus 64 to the communications module 58 for the code segment using the other information in the bootloader write command. The communications module 58 may send the code segment again over the communication bus 64 in response to the read command. Alternatively, the bootloader write commands are first all received over the communication bus 64, and then the driver program code$_U$ is assembled in the program memory segment 110 of the memory 72.

Figure 14C:
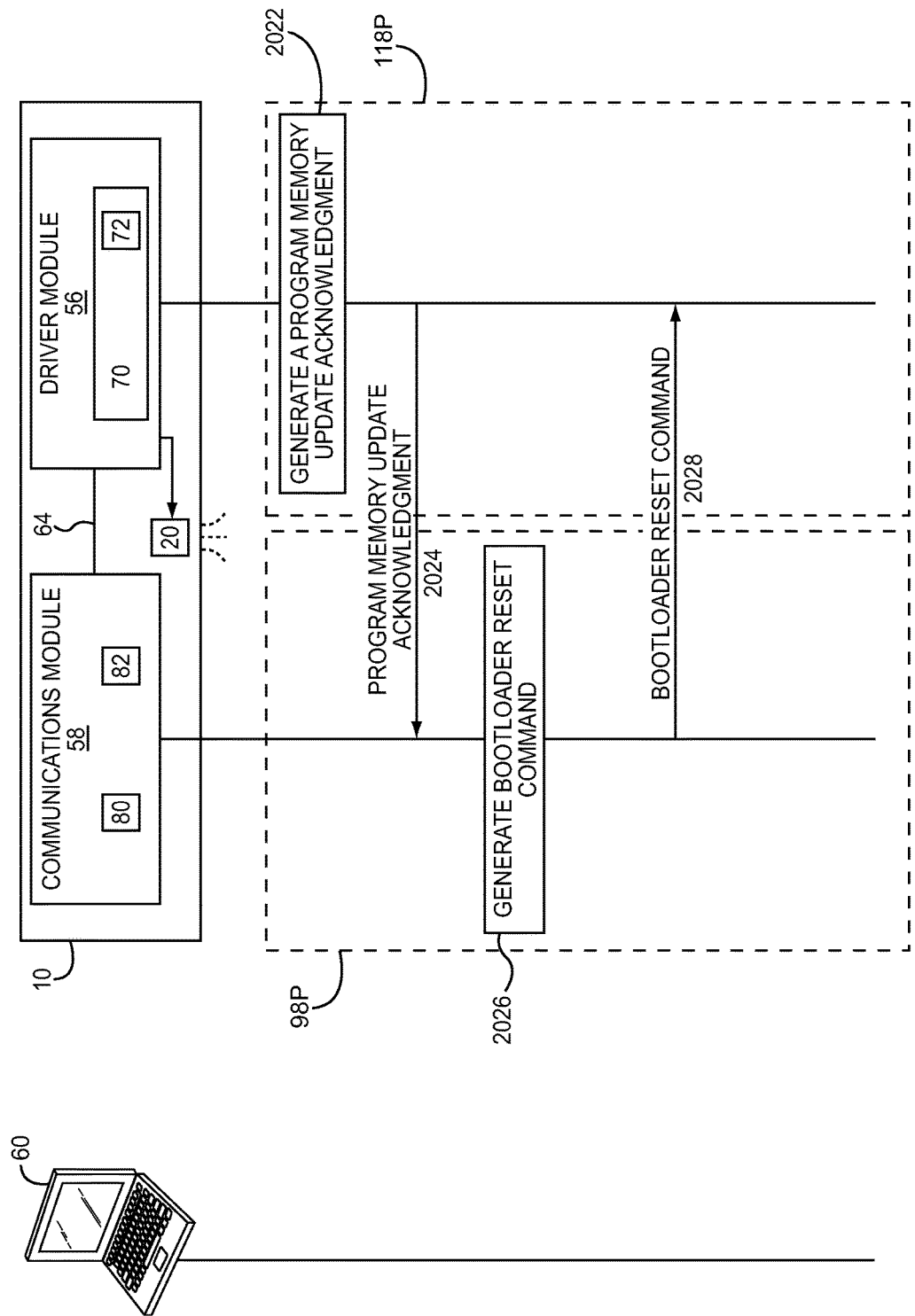

Referring now to FIG. 14C, once the driver program code$_U$ is in the program memory segment 110 of the memory 72, the control circuitry 70 of the driver module 56 may generate a program memory update acknowledgment (procedure 2022). The program memory update acknowledgment is then transmitted over the communication bus 64 to the communications module 58 (procedure 2024). Accordingly, the driver module 56 sends the program memory update acknowledgment over the communication bus 64 and the communications module 58 receives the program memory update acknowledgment over the communication bus 64. In response to the program memory update acknowledgment, the control circuitry 80 of the communications module 58 generates a bootloader reset command (procedure 2026). The bootloader reset command is then transmitted over the communication bus 64 to the driver module 56 (procedure 2028). Accordingly, the communications module 58 sends the bootloader reset command over the communication bus 64 and the driver module 56 receives the bootloader reset command over the communication bus 64.

Figure 15:
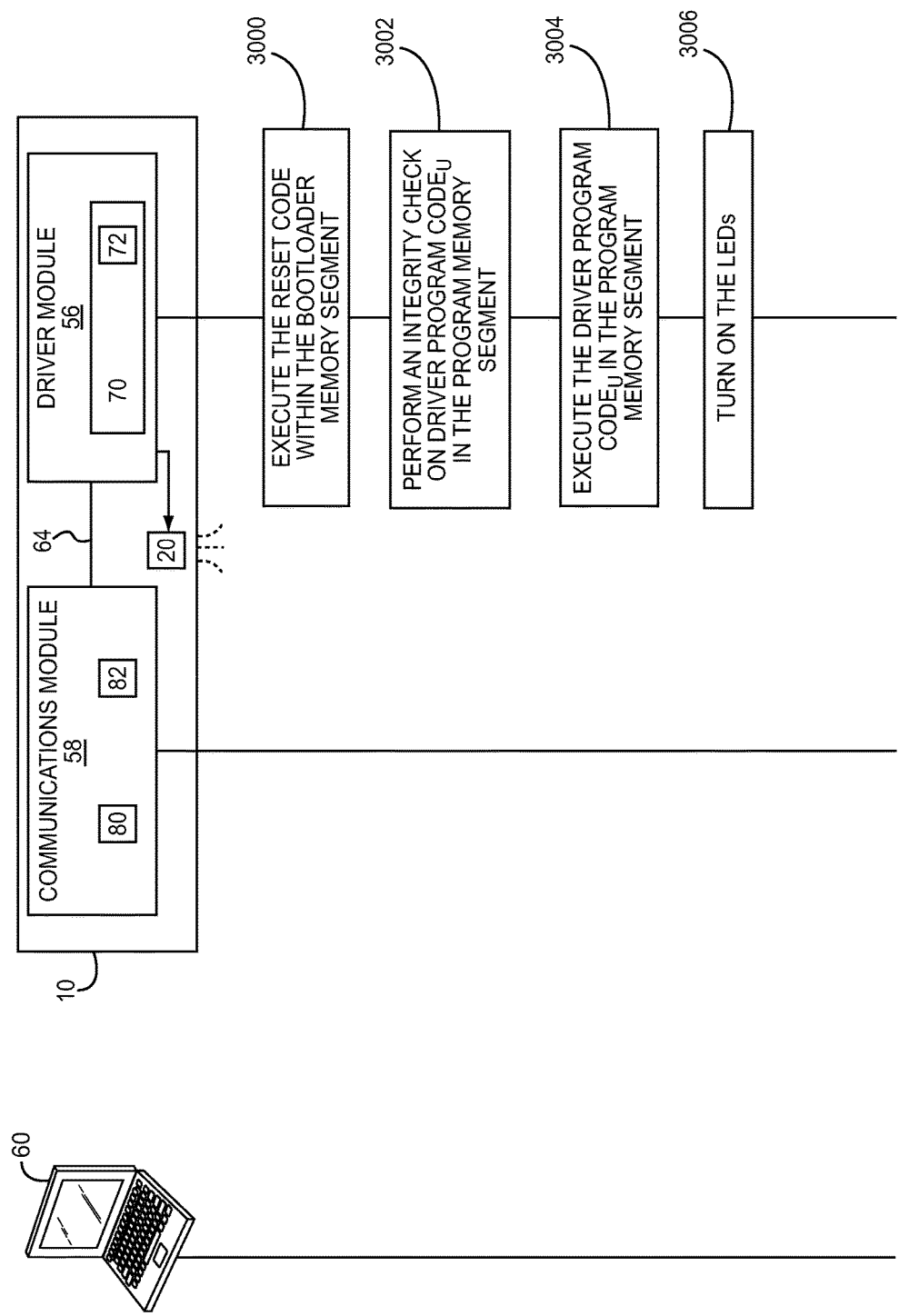
FIG. 15 illustrates exemplary procedures that may be implemented by the driver module once the updated driver program code is stored in a program memory segment of the memory.

Referring now to FIGS. 9, 12, and 15, FIG. 15 illustrates exemplary procedures that may be implemented by the driver module 56 once the driver program code$_U$ is stored in the program memory segment 110 of the memory 72. In response to the bootloader reset command from the communications module 58, the update command handler routine is ended and the control circuitry 70 of the driver module 56 jumps to the reset code 116 in the bootloader memory segment 108. Thus, once the update command handler code 118 has been executed, the control circuitry 70 of the driver module 56 executes the reset code 116 within the bootloader memory segment 108 (procedure 3000). This resets the driver module 56 after the update. Accordingly, the control circuitry 70 is bootstrapped in order to execute the driver program code$_U$ in the program memory segment 110 of the memory 72. The control circuitry 70 of the driver module 56 may then perform an integrity check of the driver program code$_U$ in the program memory segment 110 (procedure 3002). If the driver program code$_U$ in the program memory segment 110 passes the integrity check, the control circuitry 70 may then jump from the bootloader memory segment 108 to the program memory segment 110 of the memory 72. The control circuitry 70 of driver module 56 then executes the driver program code$_U$ in the program memory segment 110 of the memory 72 (procedure 3004). Once the control circuitry 70 of driver module 56 is executing the driver program code$_U$, the driver module 56 again turns on the LEDs in the LED array 20 (procedure 3006). As such, the driver module 56 provides lighting control functionality and other ancillary functionality in accordance with the execution of the driver program code$_U$. In this manner, the driver program code$_U$ may be operable so that the driver module 56 can provide additional lighting control functionality, provide ancillary functionality, fix bugs within the driver program code$_O$, and/or the like.

Figure 16:
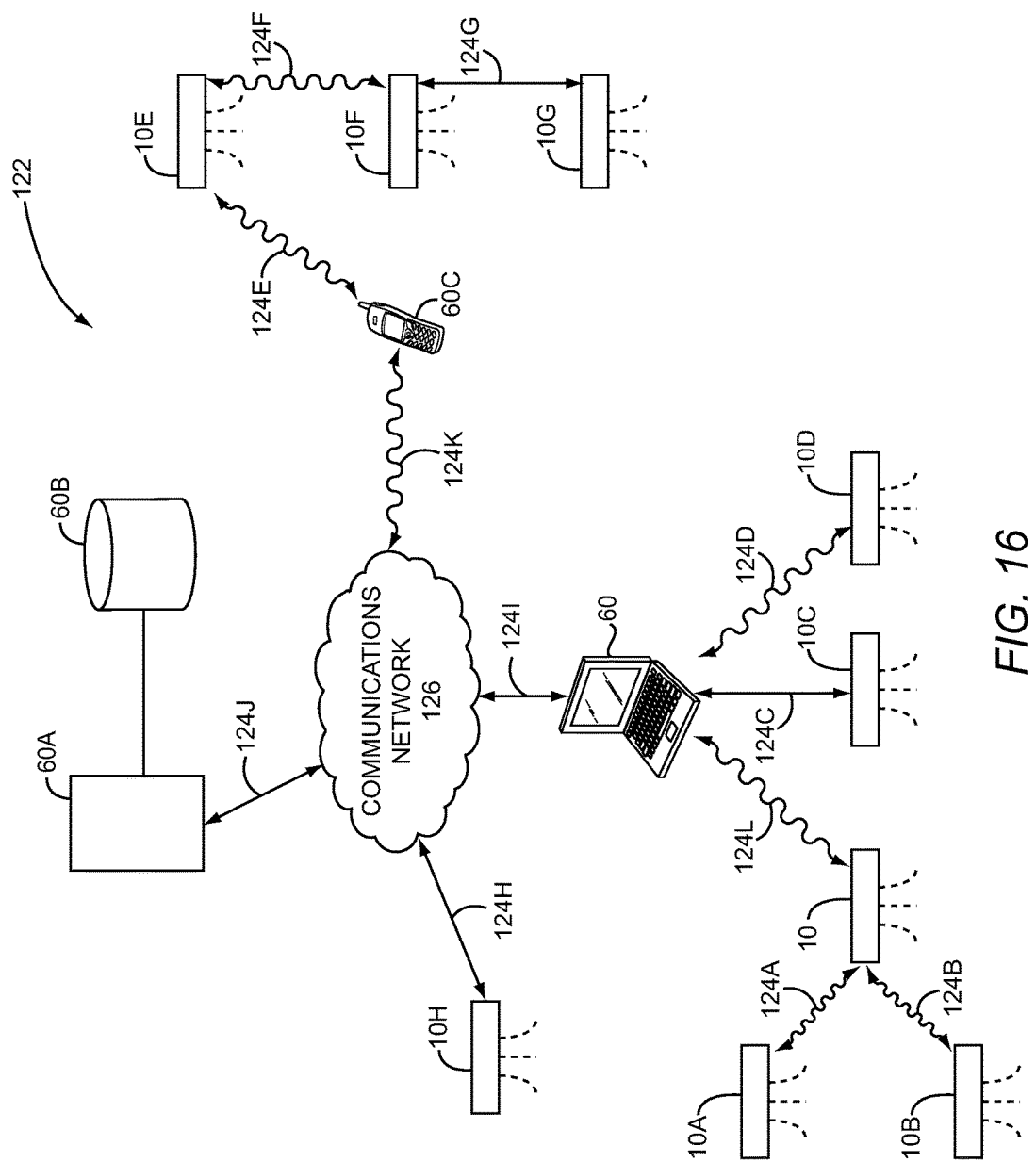
FIG. 16 illustrates one embodiment of a lighting network that includes the lighting fixture and the remote device.

FIG. 16 illustrates one embodiment of a lighting network 122 that includes the lighting fixture 10 and the remote device 60. Other lighting fixtures 10A-10H are also provided in the lighting network 122. In this embodiment, the other lighting fixtures 10A-10H are each identical to the lighting fixture 10. This may or may not be the case, depending on the particular arrangement for the lighting network 122. Additionally, the lighting network 122 includes other non-lighting types of remote devices 60A-60C. The various lighting fixtures 10, 10A-10H, and the remote devices 60, 60A-60C are communicatively associated through communication links 124A-124L, as shown in FIG. 16. In this embodiment, the communication links 124A, 124B, 124D, 124E, 124F, 124K, and 124L are RF communication links, while the communication links 124C, 124G, 124H, 124I, and 124J, are wired communication links. The communication links 124I, 124J, and 124K are established by the remote devices 60, 60A, and 60C through a communications network 126. The communication link 124H is also established by the lighting fixture 10H through the communications network 126. The lighting network 122 allows for the lighting fixtures 10, 10A-10H to be operated together.

In this embodiment, the remote device 60A is a server computer and the remote device 60B is a database coupled to the remote device 60A. The database may store lighting network information related to the lighting network 122, control and status information (both current and historical) from the lighting fixtures 10, 10A-10H, various versions of the driver program code (including both older versions of the driver program code and the driver program code$_U$), and end point profiles for the lighting network 122. The remote device 60A is configured to manage queries to the remote device 60B, along with administering various types of programs for the lighting network 122. For example, when the driver program code$_U$ is obtained by the remote device 60A, the remote device 60A may be configured to distribute the driver program code$_U$ to the remote devices 60, 60C, and the lighting fixture 10H through the communications network 126.

The remote device 60 and the lighting fixtures 10, 10C, and 10D have a star network topology, where the remote device 60 is the central node. Accordingly, the remote device 60 may transmit the driver program code$_U$ to the lighting fixtures 10, 10C, and 10D over the communication links 124L, 124C, and 124D.

The remote device 60C and the lighting fixtures 10E-10G have a point-to-point network topology. Accordingly, the remote device 60C may transmit the driver program code$_U$ to the lighting fixture 10E over the communication link 124E. The lighting fixture 10F then relays the driver program code$_U$ over the communication link 124F to the lighting fixture 10F. Next, the lighting fixture 10F relays the driver program code$_U$ over the communication link 124G to the lighting fixture 10G.

The lighting fixtures 10, 10A, and 10B have another star network topology where the lighting fixture 10 is a central node. Accordingly, the lighting fixture 10 relays the driver program code$_U$ to the lighting fixture 10A over the communication link 124A. The lighting fixture 10 also relays the driver program code$_U$ to the lighting fixture 10B over the communication link 124B. While this embodiment of the lighting network 122 uses star network topologies and point to point network topologies, it should be noted that the lighting network 122 may be provided in any suitable network topology. For example, the lighting network 122 may utilize have a star network topology, a point-to-point network topology, a broadcast networking topology, a token-passing networking topology, a designated network topology, and/or any number of combinations of the various networking topologies which are amalgamated to form the lighting network 122.

Figure 17:
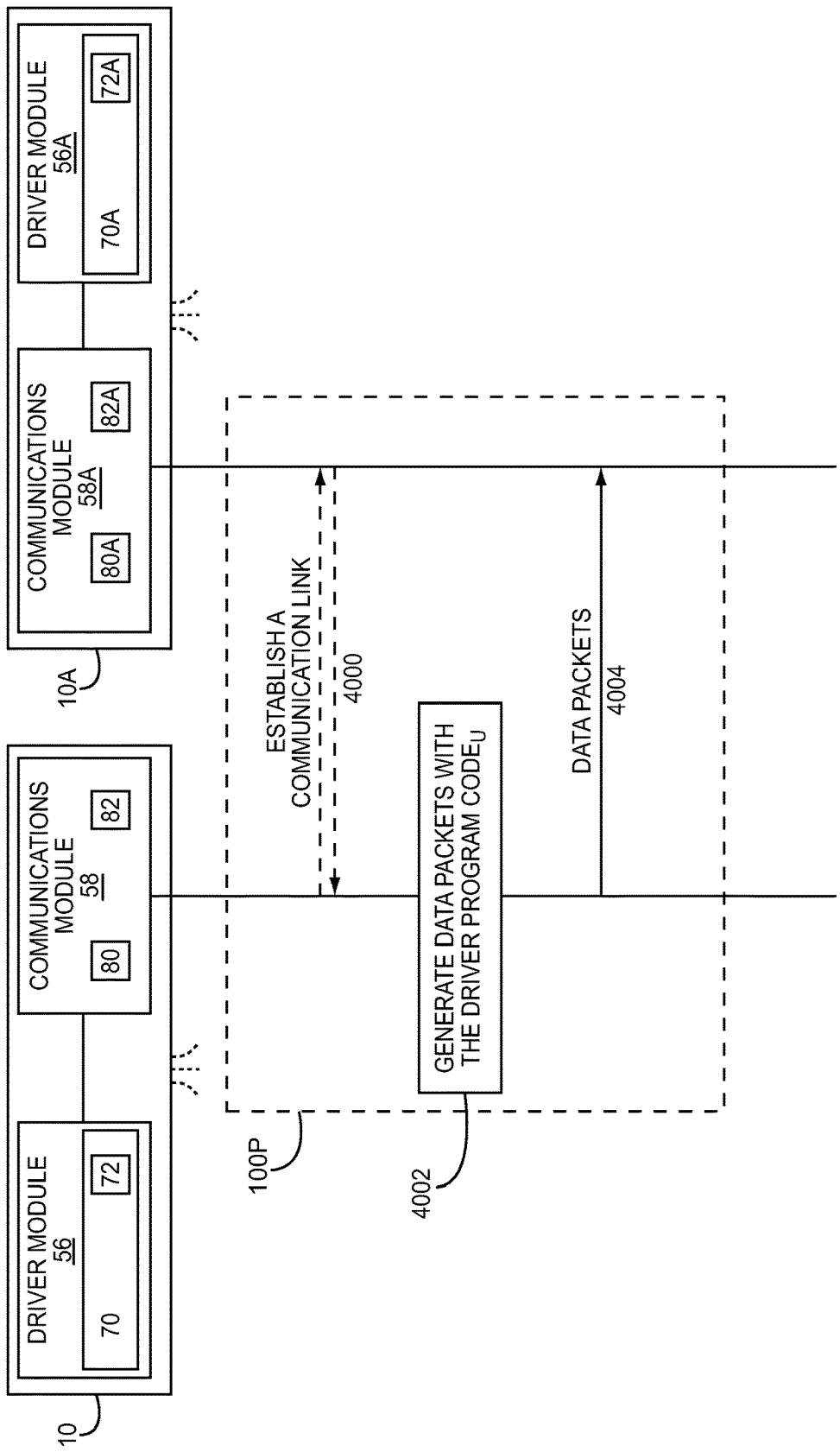
FIG. 17 illustrates exemplary procedures for transmitting the updated driver program code from the lighting fixture to another lighting fixture after the communications module has received the updated driver program code from the remote device, as described in the exemplary procedures of FIGS. 13A and 13B.

Referring now to FIGS. 10, 11, and 17, FIG. 17 illustrates exemplary procedures for transmitting the driver program code$_U$ from the lighting fixture 10 to the lighting fixture 10A. When discussing the exemplary procedures in FIG. 17, it is presumed that the exemplary procedures in FIGS. 13A and 13B have already been performed by the lighting fixture 10 such that the driver program code$_U$ is already in the memory segment 96 of the memory 82. To relay the driver program code$_U$ to the lighting fixture 10A, the control circuitry 80 of the communications module 58 in the lighting fixture 10 may execute the driver program transmit handler code 100 in the memory 82. The driver program transmit handler code 100 causes the control circuitry 80 to implement the driver program transmit handler program. The procedures of the driver program transmit handler program resulting from the execution of the driver program transmit handler code 100 are demarcated by number 100P in FIG. 17.

For the sake of brevity and clarity, the lighting fixture 10A in FIG. 17 is assumed to be identical to the lighting fixture 10, except that the lighting fixture 10A does not have the driver program code$_U$. As such, the lighting fixture 10A has a driver module 56A and a communications module 58A. The driver module 56A is identical to the driver module 56 of the lighting fixture 10, except that the driver module 56A is executing the driver program code$_O$. The communications module 58A is identical to the communications module 58, except that the communications module 58A does not have the driver program code$_U$. Again, the lighting fixture 10 and the lighting fixture 10A are not required to have identical components.

If a communication link has not been established between the communications module 58 of the lighting fixture 10 and the communications module 58A of the lighting fixture 10A, the communications module 58 of the lighting fixture 10 and the communications module 58A of the lighting fixture 10A establish the communication link (procedure 4000). Thus, the communications module 58 of the lighting fixture 10 and the communications module 58A of the lighting fixture 10A may each implement handshaking procedures to establish the communication link. Both the communications module 58 of the lighting fixture 10 and the communications module 58A of the lighting fixture 10A may be configured to initiate the establishment of this communication link.

To send the driver program code$_U$ to the lighting fixture 10A over the communication link, the communications module 58 may generate data packets with the driver program code$_U$ (procedure 4002). Since the data packets are formatted in accordance with the communications protocol of the communication link, the data packets have payload data frames, wherein each of the payload data frames has a payload data frame size set in accordance with the communications protocol. If each of the data packets includes a single one of the payload data frames, the payload data frames bijectively correspond with the data packets. Generally, the payload data frame size of the communications protocol is not large enough to include all of the driver program code$_U$. As such, the control circuitry 80 of the communications module 58 in the lighting fixture 10 may divide the driver program code$_U$ into code segments equal to or smaller than the payload data frame size. The code segments are then included the payload data frames of the data packets. Accordingly, each of the payload data frames may include one of the code segments.

Note, however, that for various reasons, the payload data frames may or may not bijectively correspond with the code segments. For example, due to errors at either the communications module 58 or the communications module 58A, one or more of the code segments may need to be repeated within the payload data frames of the data packets. As such, the code segments may only surjectively correspond onto the payload data frames having the driver program code$_U$.

The data packets are transmitted over the communication link to the communications module 58A of the lighting fixture 10A (procedure 4004). Accordingly, the communications module 58 sends the data packets over the communication link and the communications module 58A receives the data packets over the communication link. It should be noted that the procedure 4002 and the procedure 4004 may or may not be temporally exclusive. For example, the communications module 58 of the lighting fixture 10 may generate one of the data packets and then send the data packet over the communication link. Thus, as each one of the data packets is generated, that data packet is sent over the communication link. Alternatively, the communications module 58 of the lighting fixture 10 may first generate all of the data packets and then send all of the data packets over the communication link. To update the driver program code$_O$ with the driver program code$_U$, the lighting fixture 10A may then implement the exemplary procedures described above with regard to FIGS. 14A-14C.

Those skilled in the art will recognize improvements and modifications to the embodiments of the present disclosure.

All such improvements and modifications are considered within the scope of the concepts disclosed herein and the claims that follow.

What is claimed is:

1. A lighting fixture, comprising:
one or more solid-sate lighting sources;
memory storing driver program code;
a driver module configured to:
  execute the driver program code in the memory, wherein the driver program code causes the driver module to directly regulate a current provided to the one or more solid-state light sources; and
  write updated driver program code in the memory; and
a communications module configured to:
  receive data packets with the updated driver program code over a communication link;
  assemble the updated driver program code in second memory of the communications module from the data packets with the updated driver program code; and
  send the updated driver program code to the driver module, wherein the one or more solid-state lighting sources, the memory, the driver module and the communications module are co-located within the lighting fixture.

2. The lighting fixture of claim 1 wherein the one or more solid-state light sources comprise one or more light emitting diodes (LEDs).

3. The lighting fixture of claim 1 wherein the communications module is further configured to establish a communication link with a remote device.

4. The lighting fixture of claim 1 wherein the communication link is an RF communication link.

5. The lighting fixture of claim 1 further comprising a communication bus communicatively associated with the communications module and the driver module, wherein, in order to send the updated driver program code to the driver module, the communications module is configured to transmit the updated driver program code over the communication bus to the driver module.

6. The lighting fixture of claim 1 wherein the communications module is configured to send the updated driver program code that is assembled in the second memory to the driver module.

7. The lighting fixture of claim 1 wherein the communications module is configured to perform an integrity check on the updated driver program code assembled in the second memory prior to sending the updated driver program code to the driver module.

8. The lighting fixture of claim 1 wherein the memory of the driver module is further configured to store update command handler code and the driver module is configured to execute the update command handler code, wherein the update command handler code causes the driver module to write the updated driver program code to the memory.

9. The lighting fixture of claim 1 wherein the memory of the driver module is partitioned to define a program memory segment configured to store the driver program code and a bootloader memory segment that is configured to store update command handler code, wherein the update command handler code causes the driver module to:
  erase the driver program code in the program memory segment; and
  write the updated driver program code in the program memory segment.

10. The lighting fixture of claim 9 wherein the bootloader memory segment is further configured to store reset code and wherein:
  the communications module is configured to generate a bootloader reset command once the updated driver program code is in the program memory segment of the memory; and
  the driver module is configured to:
    execute the reset code in response to the bootloader reset command from the communications module, wherein the reset code causes the driver module to reset; and
    execute the updated driver program code in the program memory segment once the driver module has been reset.

11. The lighting fixture of claim 9 wherein the driver module, in response to an update command, is configured to:
  interrupt execution of the driver program code within the program memory segment of the memory; and
  execute the update command handler code within the bootloader memory segment.

12. The lighting fixture of claim 11 wherein:
the communications module is further configured to:
  generate the update command as a result of receiving the updated driver program code from a remote device;
  send the update command to the driver module; and
  send the updated driver program code in response to receiving an erase acknowledgment from the driver module; and
the update command handler code further causes the driver module to:
  generate the erase acknowledgment once the driver program code is erased from the program memory segment; and
  send the erase acknowledgment to the communications module.

13. The lighting fixture of claim 12 wherein:
the communications module is further configured to:
  generate bootloader write commands with the updated driver program code in response to the erase acknowledgment; and
  transmit the bootloader write commands with the updated driver program code to the driver module so as to send the updated driver program code; and
the update command handler code further causes the driver module to:
  write the updated driver program code from the bootloader write commands into the program memory segment of the memory in response to the bootloader write commands received from the communications module.

14. The lighting fixture of claim 13 further comprising a communication bus communicatively associated with the communications module and the driver module, wherein:
the communications module is configured to:
  transmit the update command over the communication bus so as to send the update command to the driver module; and
  transmit the bootloader write commands over the communication bus so as to send the bootloader write commands with the updated driver program code to the driver module; and
the update command handler code causes the driver module to:

transmit the erase acknowledgment over the communication bus so as to send the erase acknowledgment to the communications module.

15. A driver module comprising:
    memory that is partitioned to have a program memory segment storing driver program code and a bootloader memory segment storing update command handler code; and
    control circuitry configured to execute the driver program code in the program memory segment and the update command handler code in the bootloader memory segment, wherein the driver program code causes the control circuitry to directly regulate a current provided to one or more solid-state light sources, and wherein the update command handler code causes the control circuitry to write updated driver program code in the program memory segment of the memory.

16. The driver module of claim 15 wherein, in response to an update command, the control circuitry is further configured to:
    interrupt execution of the driver program code in the program memory segment; and
    begin execution of the updated command handler code in the bootloader memory segment.

17. The driver module of claim 15 wherein the updated command handler code further causes the control circuitry to:
    erase the driver program code in the program memory segment of the memory;
    receive bootloader write commands with the updated driver program code; and
    write the updated driver program code from the bootloader write commands in the program memory segment of the memory in response to the bootloader write commands so as to write the updated driver program code in the program memory segment of the memory.

18. The driver module of claim 17 wherein the bootloader memory segment of the memory further stores reset code, the control circuitry being configured to execute the reset code in response to a bootloader reset command, wherein the reset code causes the driver module to reset.

* * * * *

UNITED STATES PATENT AND TRADEMARK OFFICE
CERTIFICATE OF CORRECTION

PATENT NO. : 10,064,251 B2
APPLICATION NO. : 13/833608
DATED : August 28, 2018
INVENTOR(S) : Daniel J. Pope et al.

Page 1 of 1

It is certified that error appears in the above-identified patent and that said Letters Patent is hereby corrected as shown below:

In the Specification

In Column 13, Line 14, replace "LED strings 51" with --LED strings S1--.

In the Claims

In Column 27, Line 7, Claim 1 replace "one or more solid-sate" with --one or more solid-state--.

Signed and Sealed this
Second Day of October, 2018

Andrei Iancu
*Director of the United States Patent and Trademark Office*